US012811399B2

(12) United States Patent
Pianin et al.

(10) Patent No.: US 12,811,399 B2
(45) Date of Patent: Nov. 24, 2026

(54) ADAPTIVE LOAD SHARING OPTIMIZATION

(71) Applicant: Cisco Technology, Inc., San Jose, CA (US)

(72) Inventors: Jerrold Pianin, Phoenix, AZ (US); Yi Tang, San Jose, CA (US); Shobhana R. Punjabi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/959,231

(22) Filed: Nov. 25, 2024

(65) Prior Publication Data

US 2026/0149277 A1 May 28, 2026

(51) Int. Cl.
*H02J 3/007* (2026.01)
*G06Q 50/06* (2024.01)
(Continued)

(52) U.S. Cl.
CPC ............ *H02J 3/0075* (2020.01); *G06Q 50/06* (2013.01); *H02J 3/003* (2020.01); *H02J 2103/30* (2026.01); *H02J 2103/35* (2026.01)

(58) Field of Classification Search
CPC ...... H02J 3/0075; H02J 3/003; H02J 2103/30; H02J 2103/35; G06Q 50/06; H02M 3/1584; H02M 3/1586
See application file for complete search history.

(56) References Cited

U.S. PATENT DOCUMENTS

| | | | | |
|---|---|---|---|---|
| 2009/0106571 | A1 | 4/2009 | Low et al. | |
| 2017/0179824 | A1* | 6/2017 | Polhemus .......... | G01R 19/0092 |
| 2022/0368230 | A1* | 11/2022 | Kshirsagar .............. | H02J 1/102 |

FOREIGN PATENT DOCUMENTS

| | | |
|---|---|---|
| CN | 114915631 A | 8/2022 |
| KR | 102566878 B1 | 8/2023 |

OTHER PUBLICATIONS

Chaudhari S., et al., “Load Sharing Energy Savings Methodology for Systems with Multiple Centrifugal Compressors”, Journal of Cleaner Production, vol. 433, No. 139630, Dec. 25, 2023, pp. 1-12.

(Continued)

*Primary Examiner* — Rexford N Barnie
*Assistant Examiner* — Thai H Tran
(74) *Attorney, Agent, or Firm* — Rutan & Tucker, LLP; Ravi Mohan; Marc A. McClain

(57) ABSTRACT

Devices and methods are provided for adaptively optimizing load sharing to minimize power consumption. A controller receives an initial input power supplied by multiple power stages of a power supply unit to an electronic device. The controller adaptively configures load sharing settings of one or more power stages based on the initial input power and one or more parameters associated with the electronic device to achieve a minimum input power consumption. The power stage(s) exhibits uneven load sharing based on the load sharing settings. To supply an updated input power to the electronic device, the controller controls the power stage(s) based on the load sharing settings. The initial input power and the updated input power correspond to a total power consumption of the electronic device. The controller performs continuous monitoring, real-time analysis, and adaptive adjustments to optimize power usage based on specific hardware characteristics, environmental conditions, and dynamic load behavior.

20 Claims, 9 Drawing Sheets

(51) Int. Cl.
*H02J 3/00* (2026.01)
*H02J 103/30* (2026.01)
*H02J 103/35* (2026.01)

(56) References Cited

OTHER PUBLICATIONS

Zawaideh A.A., et al., "Minimum Energy Adaptive Load Sharing of Parallel Operated Compressors", IEEE Open Journal of Industry Applications, vol. 3, Jul. 20, 2022, pp. 178-191.

* cited by examiner

ADAPTIVE LOAD SHARING OPTIMIZATION

The present disclosure relates to power management. More particularly, the present disclosure relates to adaptive load sharing optimization for minimizing power consumption.

BACKGROUND

Optimizing load sharing in an electronic system may be required for ensuring optimal heat distribution among components of the electronic system, reducing the risk of overheating, extending a lifespan of the components, and improving overall system efficiency. Optimizing load sharing may include balancing power consumption across multiple components, thereby ensuring reliable operation in various applications and minimizing energy waste. Achieving optimal power consumption in electronic systems may be a multifaceted challenge that hinges on several critical factors. These factors may include, for example, efficiency of Point-of-Load (POL) converters under varying load conditions, power distribution losses attributable to a physical layout of an electronic system, such as power planes, a dynamic nature of an electrical load, or the like. These factors can lead to shifting hot spots within an integrated circuit, for example, an Application-Specific Integrated Circuit (ASIC), due to changes in application usage and temporal factors.

Conventional methodologies for optimizing POL efficiency may often rely solely on datasheet specifications, which may not account for unique hardware variations that can occur in individual components of an electronic system. Moreover, these methodologies may overlook nuances of actual performance under specific operational conditions. Similarly, optimization of power distribution may depend on design-stage considerations such as placement of the components in the electronic system, which may not account for the particular hardware in use or environmental conditions at the time of operation. Further, dynamic behavior of the electrical load may be addressed with only a coarse level of resolution, failing to capture fine-grained fluctuations that can significantly impact power efficiency.

SUMMARY OF THE DISCLOSURE

Devices and methods for adaptively optimizing load sharing in accordance with embodiments of the disclosure are described herein. In many embodiments, a device may include a processor and a memory communicatively coupled to the processor. The memory may include a power optimization logic that is configured to receive an initial input power supplied by a plurality of power stages of a power supply unit to an electronic device. The power optimization logic may further be configured to adaptively configure load sharing settings of one or more power stages of the plurality of power stages based on the initial input power and one or more parameters associated with the electronic device. The power optimization logic may further be configured to control, to supply an updated input power to the electronic device, the one or more power stages based on the adaptively configured load sharing settings.

In a number of embodiments, the one or more parameters comprise at least one of: one or more hardware characteristics of the electronic device, one or more environmental conditions proximate to the electronic device, one or more applications running on the electronic device, or power distribution losses in the electronic device.

In a variety of embodiments, the load sharing settings of the one or more power stages are adaptively configured further based on load behavior of the plurality of power stages.

In various embodiments, the plurality of power stages exhibits uneven load sharing based on the adaptively configured load sharing settings.

In more embodiments, the plurality of power stages is operably coupled to a plurality of locations of the electronic device.

In additional embodiments, the load sharing settings of the one or more power stages are adaptively configured based on safety thresholds defined for the plurality of locations of the electronic device.

In further embodiments, a location of the plurality of locations comprises a power monitor located in the electronic device.

In still more embodiments, the location of the plurality of locations comprises one or more pins external to the electronic device, wherein the one or more pins are associated with the power monitor.

In still further embodiments, the electronic device is disposed on a printed circuit board, and a location of the plurality of locations comprises one or more sense points on the printed circuit board.

In still additional embodiments, the adaptive configuration of the load sharing settings of the one or more power stages is performed in real time or near real time.

In yet various embodiments, controlling the one or more power stages comprises varying phase currents supplied by the one or more power stages to the electronic device based on the load sharing settings.

In yet more embodiments, the initial input power and the updated input power correspond to a total power consumption of the electronic device.

In still yet more embodiments, the updated input power is less than the initial input power.

In some more embodiments, the updated input power is a minimum input power.

In many further embodiments, the power optimization logic is further configured to apply one or more thresholds to control the one or more power stages.

In many additional embodiments, the updated input power is supplied to the electronic device in accordance with a configurable range.

In still yet further embodiments, a power supply unit may include a plurality of power stages and a controller operably coupled to the plurality of power stages. The plurality of power stages may be configured to supply an initial input power to an electronic device. The controller may be configured to adaptively configure load sharing settings of one or more power stages of the plurality of power stages based on the initial input power and one or more parameters associated with the electronic device. The controller may be configured to control, to supply an updated input power to the electronic device, the one or more power stages based on the adaptively configured load sharing settings.

In several more embodiments, a method for adaptively optimizing load sharing may include receiving an initial input power supplied by a plurality of power stages of a power supply unit to an electronic device. The method for adaptively optimizing load sharing may further include adaptively configuring load sharing settings of one or more power stages of the plurality of power stages based on the initial input power and one or more parameters associated with the electronic device. The method for adaptively optimizing load sharing may further include controlling, to supply an updated input power to the electronic device, the one or more power stages based on the adaptively configured load sharing settings.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
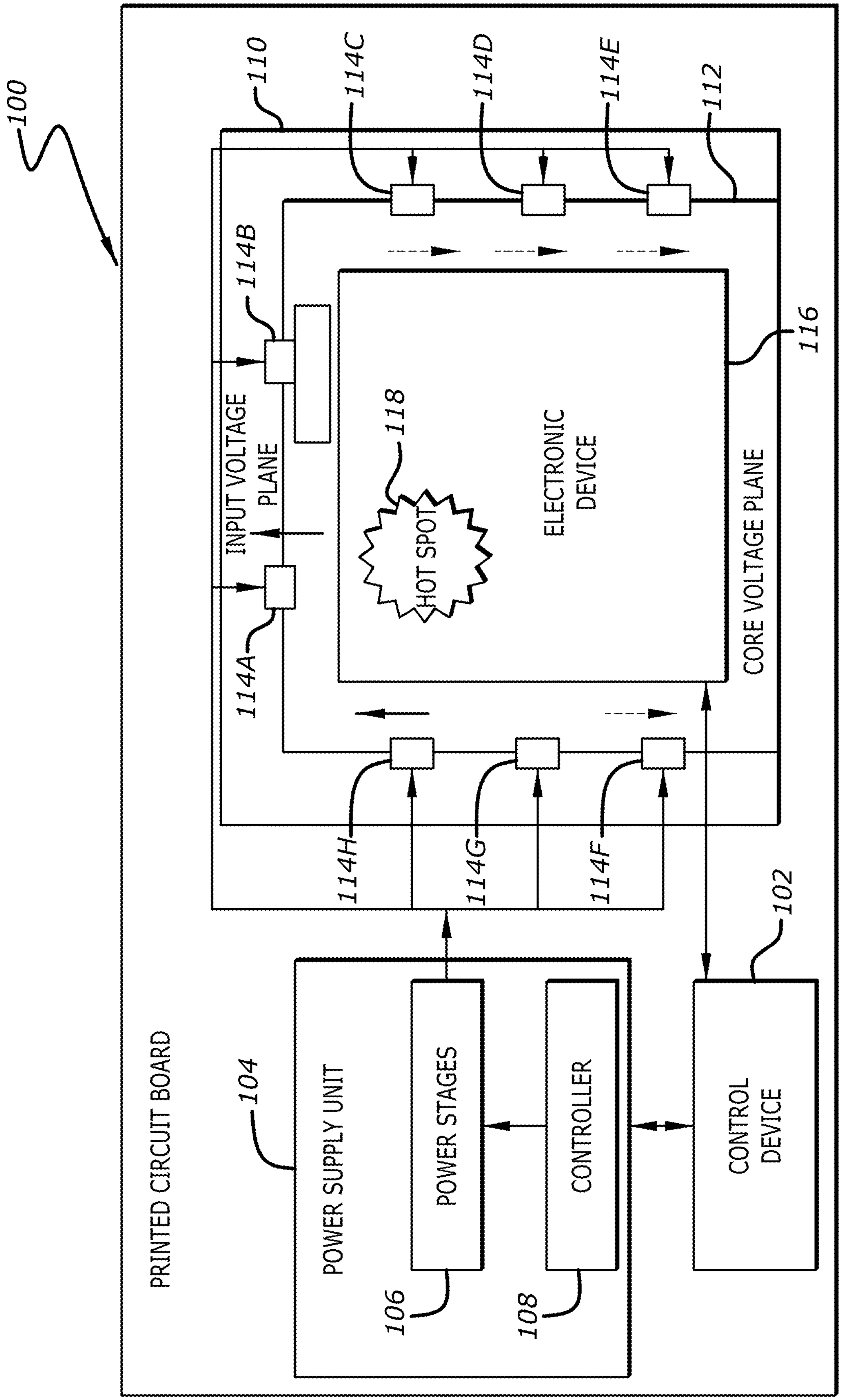
FIG. 1 is a block diagram of a system for adaptively optimizing load sharing in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in a commercially feasible embodiment are often not depicted to facilitate a less obstructed view of these various embodiments of the present disclosure.

DETAILED DESCRIPTION

In response to the issues described above, devices and methods are discussed herein for adaptively optimizing load sharing between multiple power stages of a power supply unit to minimize power consumption. Load sharing may refer to distributing an electrical load across the power stages of the power supply unit. Power stages may refer to phases of the power supply unit or a combination of components responsible for converting, regulating, and distributing power within an electronic system. In many embodiments, a power stage may include components, for example, voltage regulators such as buck converters, multi-phase regulators, or the like, capacitors, and control circuits that manage power delivery. The power stage may ensure that the electronic system receives the correct voltage and current levels required for its operation. Load sharing may be implemented in electronic systems where multiple power stages operate in parallel to collectively provide a required power output while distributing the electrical load among themselves. The present disclosure provides power efficiency optimization methods that may dynamically adjust load sharing settings, for example, load sharing percentages, across multiple power stages of the power supply unit to achieve minimum power consumption. The present disclosure may treat load sharing percentages of the power stages as variables and power consumption as a metric for optimization on specific hardware running a particular application at any given time. The present disclosure may implement continuous monitoring, real-time analysis, and dynamic adjustments of phase currents to achieve minimum power consumption during operation in the field.

To improve efficiency and thermal performance under varying load conditions, conventional power supply systems, for example, Switch-Mode Power Supplies (SMPS) and converters, may implement a phase shedding technique where some phases are deactivated during low power demand and reactivated as needed. At lower electrical loads, the efficiency of a multi-phase regulator can drop if all phases are active as each active phase may consume a small amount of power. By shedding the phases, the multi-phase regulator may operate only the necessary phases, thereby improving overall efficiency. A lookup table including pre-established data, for example, a layout of a Printed Circuit Board (PCB), estimated PCB impedance characteristics, or the like, may be utilized to determine which phase may be deactivated. In applications where heat generation is a concern, phase shedding may help manage thermal performance by reducing the number of active phases, thereby decreasing overall power dissipation. In systems with rapidly changing load requirements, phase shedding can adaptively turn phases on or off to match the electrical load more closely, enhancing efficiency without compromising performance. However, implementing phase shedding may increase the complexity of control circuitry, which may make design and troubleshooting more challenging. When phases are deactivated or activated, there may be a delay in response to sudden changes in the electrical load, potentially leading to momentary voltage drops or instability during transitions. The added dynamics of phase shedding can complicate the stability of a control loop that may be implemented to adjust a duty cycle of each phase and ensure balanced current sharing.

In a conventional load sharing scenario, the electrical load may be evenly distributed among multiple phases (or power stages) of a power supply. Each phase may include a current sensing mechanism configured to monitor the electric current delivered. Some controllers may account for thermal conditions when adjusting the duty cycle of each phase to ensure balanced current sharing. However, as conventional methodologies for optimizing efficiency, for example, Point-of-Load (POL) efficiency, may rely mostly on datasheet specifications, which may fail to account for unique hardware variations that can occur in individual components of an electronic system, the nuances of actual performance under specific operational conditions may be overlooked. Further, as power distribution optimization may be focused on design-stage considerations such as placement of components in an electronic system, the specific hardware in use or environmental conditions at the time of operation may be overlooked. Furthermore, the dynamic behavior of the electrical load may be addressed with only a coarse level of resolution, failing to capture fine-grained fluctuations that can significantly impact power efficiency.

The limitations of the above conventional approaches emphasize the need for a power efficiency optimization strategy that can adapt to specific hardware characteristics, account for real-time environmental conditions, and respond to the dynamic behavior of the electrical load with greater precision. By addressing the above-discussed challenges, in a number of embodiments, the devices and methods discussed herein may provide a more energy-efficient and cost-effective power management system that not only reduces waste but also enhances the overall performance and longevity of electronic systems. Rather than targeting balanced load sharing among the power stages, in a variety of embodiments, the devices and methods discussed herein may implement a controller, for example, a Direct Current (DC)/DC controller, that may adjust load sharing settings, for example, load sharing percentages, to determine a configuration that results in the lowest power consumption. When an application and/or environment changes, for example, a shift in a hot spot, in various embodiments, the DC/DC controller may adjust the load sharing settings accordingly to achieve minimum power consumption for that specific situation. A hot spot in an electronic system may refer to a specific area or component that experiences significantly higher level of activity than surrounding areas. For example, in a Central Processing Unit (CPU), a hot spot might be a particular core that is tasked with heavy computations. This can also apply to memory, network interfaces, or storage components that are under heavy load. Further, hot spots within the electronic system may not be static. In other words, hot spots can shift dynamically based on changing workloads, such as varying application demands or multitasking. As different processes become more resource-intensive or software updates optimize performance, areas that were once less active may suddenly require more resources, causing the hot spots to shift. Unlike conventional approaches that evenly distribute the electrical load among the power stages, the devices and methods discussed herein may leverage continuous monitoring, real-time analysis, and adaptive adjustments to optimize power usage based on specific hardware characteristics, environmental conditions, and dynamic load behavior, for example, shifting hot spots. The controller may continuously monitor the power consumption while adaptively configuring the load sharing settings to achieve minimum power consumption. Adaptively configuring the load sharing settings may refer to iteratively adjusting the load sharing settings until a minimum input power consumption is achieved. Further, unlike conventional methods of even load sharing, the devices and methods discussed herein may determine optimal load sharing by minimizing power consumption. In more embodiments, a multivariate optimization algorithm may be implemented to identify optimal load sharing settings with real-time adaptation and safety thresholds that provide additional safeguards to the electronic system. In additional embodiments, the multivariate optimization algorithm may provide the optimal load sharing settings to continuously achieve minimum power consumption, while ensuring the safety thresholds are met.

Aspects of the present disclosure may be embodied as an apparatus, a system, a method, or a computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," a "module," an "apparatus," or a "system." Furthermore, aspects of the present disclosure may take the form of a computer program product embodied in one or more non-transitory computer-readable storage media storing computer-readable and/or executable program code. Many of the functional units described in this specification have been labeled as functions, to emphasize their implementation independence more particularly. For example, a function may be implemented as a hardware circuit comprising custom Very Large Scale Integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, a procedure, or a function. Nevertheless, the executables of an identified function need not be physically located together but may comprise disparate instructions stored in different locations which, when joined logically together, comprise the function and achieve the stated purpose for the function.

A function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, an apparatus, a processor, or a device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages, or the like) or other discrete electrical devices, in electrical communication with one or more other components through electrical lines of a Printed Circuit Board (PCB) or the like. Each of the functions and/or modules described herein, in more embodiments, may alternatively be embodied by or implemented as a component.

A circuit, as used herein, comprises a set of one or more electrical and/or electronic components providing one or more pathways for electric current. In additional embodiments, a circuit may include a return pathway for electric current, so that the circuit is a closed loop. In still yet additional embodiments, however, a set of components that does not include a return pathway for electric current may be referred to as a circuit (e.g., an open loop). For example, an integrated circuit may be referred to as a circuit regardless of whether the integrated circuit is coupled to ground (as a return pathway for electric current) or not. In several embodiments, a circuit may include a portion of an integrated circuit, an integrated circuit, a set of integrated circuits, a set of non-integrated electrical and/or electrical components with or without integrated circuit devices, or the like. In several more embodiments, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, a programmable array logic, a programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a PCB or the like. Each of the functions and/or modules described herein, in numerous embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B, or C" or "A, B, and/or C" mean "any of the following: A; B; C; A and B; A and C; B and C; A, B, and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a block diagram of a system 100 for adaptively optimizing load sharing in accordance with various embodiments of the disclosure is shown. By way of a non-limiting example, the embodiments of the system 100 shown in FIG. 1 illustrate a power supply unit 104 operably coupled to an electronic device 116. The power supply unit 104 may be disposed on a Printed Circuit Board (PCB) as illustrated in FIG. 1. The power supply unit 104 may, for example, include a multi-phase power supply. In many embodiments, the power supply unit 104 may be positioned proximal to components of the system 100 that the power supply unit 104 powers. For example, the power supply unit 104 may be positioned proximal to the electronic device 116. In a number of embodiments, the electronic device 116 may be a processing unit, for example, a Network Processing Unit (NPU), a Graphics Processing Unit (GPU), a Central Processing Unit (CPU), or a combination thereof. In a variety of embodiments, the electronic device 116 may, for example, be a multi-pin electronic device, an Application-Specific Integrated Circuit (ASIC), a microprocessor, or any other integrated circuit. Although represented as a single entity in FIG. 1, the electronic device 116 can encompass a group of multiple electronic devices powered by the power supply unit 116. These electronic devices may operate independently or be coupled to each other, depending on the implementation.

The electronic device 116 may be disposed on the PCB. In various embodiments, the electronic device 116 may be disposed on the PCB via power planes. The power planes may include, for example, an input voltage plane 110 and a core voltage plane 112. The input voltage plane 110 may refer to a designated area or layer in the PCB where input voltage may be supplied and distributed to various components. The input voltage plane 110 may receive and carry a primary voltage from the power supply unit 104 to the PCB and distribute the primary voltage to various locations or components on the PCB based on requirements. The core voltage plane 112 may refer to a designated area or layer in the PCB that provides power to core components on the PCB. The core voltage plane 112 may supply a required, regulated core voltage necessary for the operation of sensitive components, for example, the electronic device 116 or other integrated circuits disposed on the PCB.

In more embodiments, the power supply unit 104 may include a plurality of power stages 106 and a controller 108. The power stages 106 may be configured to supply an initial input power to the electronic device 116. In additional embodiments, the power stages 106 may be operably coupled to a plurality of locations 114A-114H of the electronic device 116. In further embodiments, a location, for example, any one or more of the locations 114A-114H, may include a power monitor located in the electronic device 116. The power monitor may be configured to measure or analyze power consumption of the electronic device 116 in real time or near real time. In still more embodiments, the amount of power consumed spatially may depend on how much traffic there is in a network or in a workload of the electronic device 116, which may vary over time. In still further embodiments, the power consumption may be sensed and outputted by the power monitor(s) in the electronic device 116. In still additional embodiments, a location, for example, any one or more of the locations 114A-114H, may include one or more pins external to the electronic device 116. In some more embodiments, the pin(s) may be associated with the power monitor. In yet various embodiments, the power consumption may be sensed from external power monitors at the pins from the electronic device 116 on the PCB. In yet more embodiments, a location, for example, any one or more of the locations 114A-114H, may include one or more sense points on the PCB. In still yet more embodiments, the power consumption may be sensed from the sense point(s) on the PCB underneath the electronic device 116.

The controller 108 may be operably coupled to the power stages 106. The controller 108 may, for example, be a Direct Current (DC)/DC controller, any other suitable controller, or a group of controllers coupled to the power stages 106. The controller 108 may be configured to receive the initial input power supplied by the power stages 106 to the electronic device 116. In many further embodiments, the controller 108 may receive the initial input power from the power monitor(s) in the electronic device 116. In many additional embodiments, the controller 108 may receive the initial input power from the pins external to the electronic device 116. In still yet further embodiments, the controller 108 may receive the initial input power associated with corresponding sense points on the PCB underneath the electronic device 116. The initial input power may refer to the amount of electrical energy the electronic device 116 draws from the power supply unit 104 and the amount of power the electronic device 116 utilizes to operate, including any losses. In still yet additional embodiments, the initial input power may correspond to a total power consumption of the electronic device 116.

The controller 108 may adaptively configure load sharing settings of one or more of the power stages 106 based on the initial input power and one or more parameters associated with the electronic device 116. In several embodiments, the load sharing settings may refer to load sharing percentages of the power stages 106. Load sharing percentages may refer to how evenly or unevenly the electrical load or power demand is distributed among the power stages 106. When multiple power stages 106 are utilized in parallel, load sharing may ensure that each power stage (any of the power stages 106) contributes to the total power output without being overloaded or underutilized. In several more embodiments, the adaptive configuration of the load sharing settings of the power stages 106 may be performed in real time or near real time.

In numerous embodiments, the parameters utilized by the controller 108 for adaptively configuring the load sharing settings of one or more of the power stages 106 may include at least one of: one or more hardware characteristics of the electronic device 116, one or more environmental conditions proximate to the electronic device 116, one or more applications running on the electronic device 116, or power distribution losses in the electronic device 116. In an example, the hardware characteristics of the electronic device 116 may include a device size, a pin configuration, a packaging type, internal wiring specification, component placement, or the like. In many examples, the environmental conditions proximate to the electronic device 116 may include a temperature, a humidity level, an altitude, electromagnetic interference, or the like in the surrounding area of the electronic device. The applications running on the electronic device 116 may indicate an activity level within the electronic device 116. When the application and/or environment changes, for example, when a hot spot 118 shifts across the electronic device 116, the controller 108 can adjust the load sharing settings accordingly to achieve minimum power consumption for a particular situation. A "hot spot" in an electronic device may refer to a specific area or component that experiences significantly higher level of activity than surrounding areas. For example, in a CPU, a hot spot might be a particular core that is tasked with heavy computations. The concept of hot spot can also apply to memory, network interfaces, or storage components that are under heavy load. Further, hot spots within an electronic device may not be static. In other words, hot spots can shift dynamically based on changing workloads, such as varying application demands or multitasking. As different processes become more resource-intensive or software updates optimize performance, areas that were once less active may suddenly require more resources, causing the hot spots to shift.

In numerous additional embodiments, the controller 108 may adaptively configure the load sharing settings of the power stages 106 further based on load behavior of the power stages 106. In further additional embodiments, each of the power stages 106 may be equipped with current sensors that measure an output current in real time, which may indicate an amount of electrical load each power stage (any of the power stages 106) is carrying. In many embodiments, output voltage sensors may monitor voltage levels of each power stage, to ensure that they operate within specified ranges. In a number of embodiments, thermal sensors may track the temperature of each power stage. High temperatures can indicate an excessive electrical load or inefficiency, prompting adaptive configuration of the load sharing settings of the power stages 106. In a variety of embodiments, the controller 108 may compute a power output for each power stage by multiplying the voltage and current readings. The controller 108 may then analyze the collected data to determine load behavior patterns, which may include, for example, assessing steady-state loads, transient loads, and peak demands. In various embodiments, the controller 108 may compare the load behavior at each power stage against predefined benchmarks or desired load-sharing profiles, which may facilitate identification over-utilized or under-utilized power stages. In more embodiments, the controller 108 may perform continuous monitoring to detect any anomalies that may indicate a failure or degradation in one of the power stages 106, prompting immediate load sharing reconfiguration. Based on the analyzed data, the controller 108 may adaptively configure load sharing settings of the power stages 106. For example, if one power stage is operating at a higher temperature or carrying more electrical load than others, the controller 108 can reduce its electrical load and shift some of the demand to cooler, less utilized power stages.

In additional embodiments, the power stages 106 may exhibit uneven load sharing based on the adaptively configured load sharing settings. Consider an example where the power supply unit 104 may include eight (8) power stages 106 operably coupled to the locations 114A-114H of the electronic device 116 and configured to supply an initial input power to the locations 114A-114H of the electronic device 116. Unlike conventional approaches that may evenly distribute the electrical load among the 8 power stages 106, the controller 108 may adaptively configure load sharing percentages of the 8 power stages 106 to unevenly distribute the electrical load among the 8 power stages 106 that achieves minimum power consumption. For example, for a core voltage of 0.7 volts (V) delivering power to an electronic device 116 such as an ASIC consuming 720 watts (W), instead of an equally distributed load sharing of about 12.5% per power stage for a total input power of 900 W, the controller 108 may adaptively configure the load sharing percentages of the 8 power stages 106 for a total input power of 885 W. For example, the controller 108 may increase the load sharing percentages of two power stages from 12.5% to 17.5%; decrease the load sharing percentages of four power stages from 12.5% to 10%; and retain the load sharing percentages of two power stages at 12.5%. In the above example, the estimated power loss may decrease from 20% at 180 W to 18.6% at 165 W. In the above example, the controller 108 may optimize the load sharing percentages to reduce power consumption from an initial baseline of 900 W with even load sharing to 885 W with adaptively configured load sharing settings.

In further embodiments, the controller 108 may adaptively configure the load sharing settings of the power stages 106 based on safety thresholds defined for the locations 114A-114H of the electronic device 116. In still more embodiments, safety thresholds may include temperature limits for various locations 114A-114H of the electronic device 116. By monitoring the temperature at different locations 114A-114H of the electronic device 116, the controller 108 may determine the maximum allowable load for each power stage to prevent overheating. In still further embodiments, safety thresholds, each of the power stages 106 may have specific voltage and current ratings. The safety thresholds may define maximum operating conditions based on the voltage and current ratings to avoid damaging components at the different locations 114A-114H of the electronic device 116.

In still additional embodiments, the controller 108 may determine the load sharing settings of the power stages 106 based on a machine learning model. In some more embodiments, the controller 108 may consider the load sharing settings of the power stages 106 as variables and power consumption as a metric for optimization on specific hardware running a particular application at any given time. In yet various embodiments, the controller 108 may execute one or more multivariate optimization algorithms, for example, gradient descent, to determine optimum load sharing settings to minimize power consumption. Gradient descent may refer to an optimization algorithm utilized for minimizing a function by iteratively moving toward the steepest descent or a direction of a negative gradient. Gradient descent may be employed in machine learning and deep learning for training models.

To supply an updated input power to the electronic device 116, the controller 108 may control the power stages 106 based on the adaptively configured load sharing settings. The power stages 106, in communication with the controller 108, may supply the updated input power to the electronic device 116. In yet more embodiments, the updated input power may correspond to a total power consumption of the electronic device 116. In still yet more embodiments, the updated input power may be less than the initial input power. In many further embodiments, the power stages 106 may supply the updated input power to the electronic device 116 in accordance with a configurable range. In many additional embodiments, the controller 108 can dynamically configure the range for the updated input power, for example, based on current requirements of the electronic device 116, operating conditions, or user settings, which may allow for optimal energy use and prevent overheating or overloading. In still yet further embodiments, sensors may be employed to monitor parameters, for example, temperature, voltage, and current, which may be utilized to determine the updated input power. In still yet additional embodiments, the power supply unit 104 may be configured to operate within a configurable range, for example, defined by a manufacturer based on specifications of the electronic device 116, or adjusted by an operator or software based on performance requirements. The power stages 106 may then supply the updated input power to the electronic device 116 in accordance with the configurable range. In several embodiments, the controller 108 may employ predictive models to anticipate power needs based on historical data or usage patterns, thereby adjusting the updated input power accordingly.

In several more embodiments, as part of controlling the power stages 106, the controller 108 may vary phase currents supplied by the power stages 106 to the electronic device 116 based on the load sharing settings. In numerous embodiments, the controller 108 may balance the number of hours of operation for each power stage to extend their lifetimes by preventing any single power stage from being overloaded or overused. In numerous additional embodiments, the controller 108 may utilize real-time data to adjust the distribution of loads dynamically, based on the current health and performance of each power stage. In further additional embodiments, the controller 108 may rotate the active power stages based on a scheduled duty cycle. For example, operation of the power stages 106 may be alternated every few hours to ensure each power stage operates with equal runtime. The controller 108 may perform continuous monitoring, real-time analysis, and dynamic adjustments of phase currents to achieve minimum power consumption during operation in the field.

In many embodiments, the controller 108 may apply one or more thresholds to control the power stages 106. For example, an operator may set a threshold that the load sharing percentage of each power stage cannot be less than 5%. In another example, the controller 108 may set a threshold voltage that, when exceeded, triggers a protective mechanism to disconnect or reduce power output of the power stages 106. In a further example, the controller 108 may establish a maximum current level, which if exceeded, can reduce power or selectively shut down the power stages 106 to prevent damage to the electronic device 116. In a further example, temperature sensors may be employed to monitor heat generated in the power stages 106. If a particular temperature is reached, the controller 108 can reduce power or selectively shut down the power stages 106 to avoid overheating.

In a number of embodiments, the system 100 may further include a control device 102 operably coupled to the power supply unit 104, the electronic device 116, or both. The control device 102 may include, for example, one or more Field-Programmable Gate Arrays (FPGAs), one or more NPUs, one or more GPUs, one or more CPUs, or a combination thereof. In a variety of embodiments, the control device 102 may be disposed on the PCB and deployed external to the power supply unit 104 and the electronic device 116. In various embodiments, the control device 102 may be configured to execute one or more functions of the controller 108. In more embodiments, the power supply unit 104 may be controlled by the controller 108 and may supply power to the electronic device 116 and the control device 102. In many additional embodiments, the control device 102 may be integrated with the electronic device 116. The control device 102 may include one or more processing units, controllers, etc, that operate in conjunction to adaptively configure load sharing settings of one or more of the power stages 106 to achieve minimum power consumption by the electronic device 116 under varying parameters.

Although a specific embodiment for a system 100 for adaptively optimizing load sharing suitable for carrying out the various steps, processes, methods, and operations described herein is discussed with respect to FIG. 1, any of a variety of systems and/or processes may be utilized in accordance with embodiments of the disclosure. For example, although the embodiments of the system 100 shown in FIG. 1 illustrate a single power supply unit 104, the scope of the system 100 may not be limited to employing a single power supply unit 104, but may be extended to employ any number of power supply units, for example, multi-phase power supplies, to supply the initial input power and the updated input power to the electronic device 116. The elements depicted in FIG. 1 may also be interchangeable with other elements of FIGS. 2-9 as required to realize a particularly desired embodiment.

Figure 2:
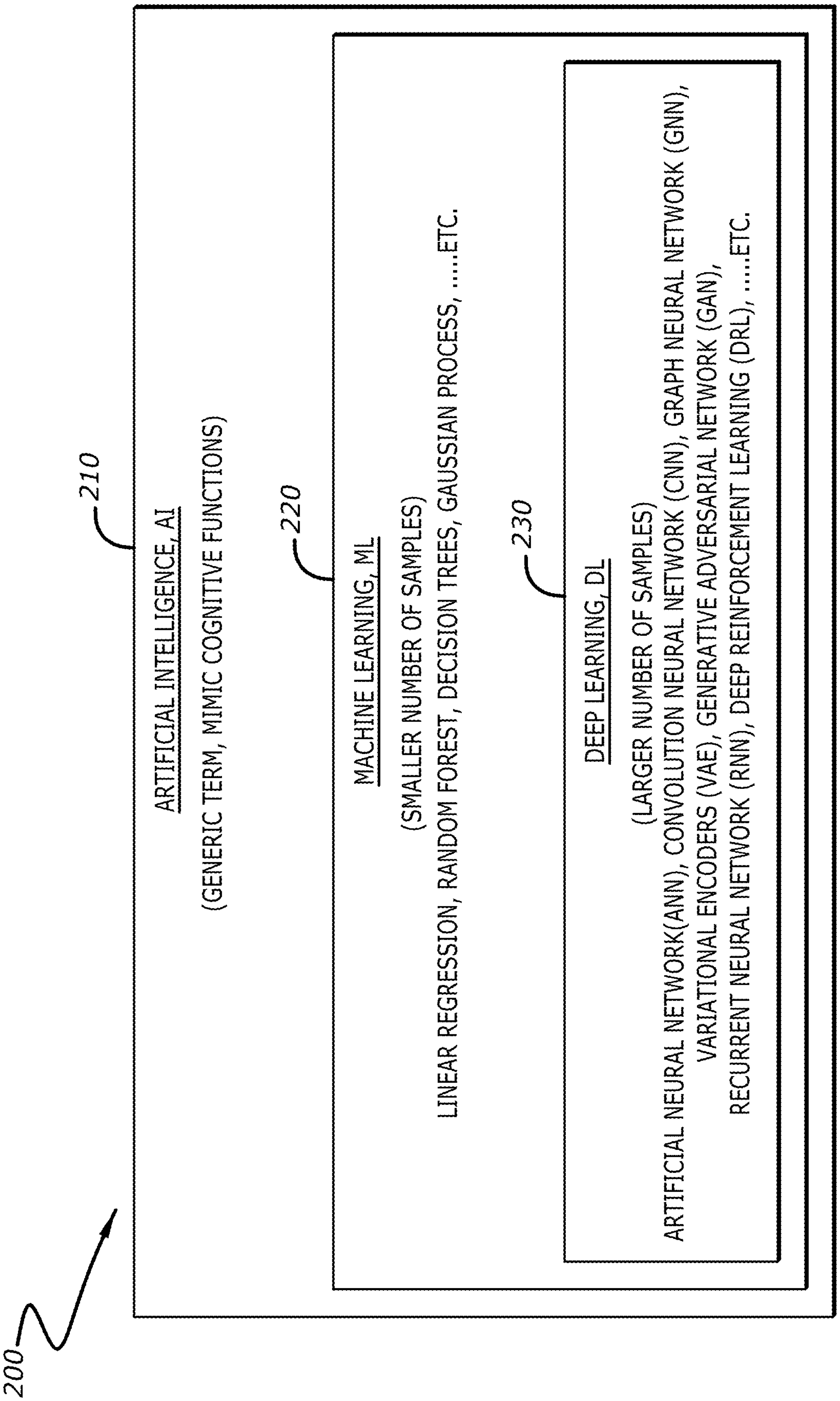
FIG. 2 is a schematic diagram illustrating various subsets of artificial intelligence in accordance with various embodiments of the disclosure.

Referring to FIG. 2, a schematic diagram 200 illustrating various subsets of artificial intelligence in accordance with various embodiments of the disclosure is shown. Artificial intelligence (AI) 210 is typically understood in the art to be the development of machines and algorithms that mimic human intelligence, for example, by optimizing actions to achieve certain goals. At its core, AI 210 often involves designing algorithms and models that mimic cognitive functions, such as learning, reasoning, problem-solving, perception, and even language understanding. Unlike conventional computer programs that follow a fixed set of instructions, AI systems can adapt, improve, and make decisions based on input data and environmental interactions.

AI 210 can be considered a generic term because AI 210 encompasses a wide range of subfields and techniques, from simple rule-based systems to advanced machine learning and deep learning models. These AI techniques are used to simulate various aspects of human cognition. For example, machine learning (ML) 220 allows computers to learn from data patterns without explicit programming for each task, while Natural Language Processing (NLP) enables machines to understand and generate human language. Deep learning (DL) 230, a more advanced branch of AI 210, utilizes neural networks to automatically learn complex patterns from large datasets, akin to information processing by the human brain. This versatility makes AI 210 a powerful tool across diverse applications, including adaptive load sharing optimization, image recognition, autonomous driving, voice assistants, healthcare diagnostics, and materials discovery.

A goal of AI 210 is often to create systems that can function autonomously and intelligently in real-world scenarios. As AI 210 continues to evolve, AI 210 can increasingly mirror human-like cognition, enabling machines to not just process data but to "think" in a way that can handle uncertainty, make predictions, and even interact with their surroundings in a meaningful manner. While AI systems are far from achieving the full breadth of human intelligence, their ability to replicate specific cognitive functions makes them invaluable in tackling complex, data-driven challenges.

ML 220 is a subset of AI 210 that focuses on the development of algorithms and statistical models that enable computers to learn and make decisions from data without explicit programming. In traditional programming, a computer is given a fixed set of rules to follow, but ML 220 can shift this paradigm by allowing systems to identify patterns, adapt, and improve their performance based on the data they encounter. This data-driven approach makes ML 220 particularly valuable for tasks that are too complex or dynamic to define using straightforward rules, such as, for example, determining load behavior patterns, recognizing images, predicting consumer behavior, or diagnosing diseases. In various embodiments described herein, machine-learning methods may be utilized to determine load behavior patterns and determine optimum load sharing settings to minimize power consumption.

ML models can be configured to analyze large amounts of data to identify trends and relationships that inform their predictions or classifications. The process typically involves three stages: training, validation, and testing. During training, the model learns from a dataset by adjusting its internal parameters to minimize errors between its predictions and the actual results. Techniques such as linear regression, decision trees, random forests, and Gaussian processes are commonly used in ML 220. These algorithms can handle various data types, including numerical, categorical, and structured datasets such as spreadsheets or grids. One of the strengths of ML 220 is its ability to generalize from the training data to make accurate predictions on new, unseen data. In a number of embodiments described herein, training data may be generated from input power values, load sharing profiles, total power consumption, and testing feedback, among other sources.

However, traditional ML methods rely heavily on feature engineering, wherein human experts manually identify the most relevant features or patterns within the data. For example, when using ML 220 for adaptive load sharing optimization, an expert may need to extract features such as load patterns, power consumption patterns, or the like before feeding them into a model. This requirement can limit the scalability of traditional ML approaches, especially when dealing with large, unstructured datasets such as images, text, or graphs. Additionally, ML algorithms may often work best when provided with relatively structured data, and they often need a reasonable number of samples (typically more than 100) to learn effectively.

DL 230 is a specialized subset of ML 220 that employs multi-layered artificial neural networks to automatically learn complex patterns and representations from large, often unstructured datasets. Inspired by the way the human brain processes information, DL 230 includes interconnected layers of "neurons" that can adaptively change as they are exposed to more data. Unlike traditional ML methods, which require manual feature engineering to identify data characteristics, DL models can automatically extract features directly from raw data, such as images, text, or molecular structures. This automated feature extraction allows DL 230 to handle data types and tasks that were previously difficult or impossible for ML models to tackle effectively.

DL models, including Convolutional Neural Networks (CNNs), Graph Neural Networks (GNNs), and Recurrent Neural Networks (RNNs), excel at processing various forms of data. CNNs are particularly effective for image analysis, recognizing intricate patterns in visual inputs, making them indispensable in areas like materials science for analyzing microscopic images or detecting defects in materials. GNNs, on the other hand, are designed to work with graph-based data, such as molecular structures, atomic interactions, power sources, loads, or the like. They can learn the dependencies and relationships within graph-like structures, which is crucial for predicting properties of complex molecules and materials. For example, the input power values or power consumption values of the power stages are modeled as a graph, which may be input into a GNN for predicting the load sharing percentages of the power stages. By organizing the input power values into a graph structure, situations where the load sharing percentages of the power stages are unknown, may be handled optimally. RNNs and their variants, such as Long Short-Term Memory (LSTM) networks, are suited for sequential data such as time series or natural language processing, allowing for the analysis and generation of textual information or the prediction of temporal patterns in scientific research.

One of the defining characteristics of deep learning is its requirement for large datasets (typically over 500 samples for example) to effectively train neural networks. The deep, multi-layered structure of these networks enables them to capture highly complex and abstract representations of the data, but it also demands significant computational power. Techniques such as Variational Autoencoders (VAEs) and Generative Adversarial Networks (GANs) add to the versatility of DL 230 by enabling the generation of new data samples that resemble the training set, aiding in areas such as materials discovery and synthetic data creation. Deep Reinforcement Learning (DRL) combines neural networks with decision-making processes to solve problems that involve optimization and control, further expanding the application potential of DL 230. In summary, the ability of DL 230 to automatically learn from raw, unstructured data and model intricate patterns makes it a powerful tool in AI 210, particularly for complex domains such as image recognition, natural language processing, and materials science.

Artificial Neural networks (ANNs or sometimes just NNs) are often a foundation of a DL system. The basic unit of a neural network is typically the perceptron, which can take inputs, assigns weights to these inputs, and combines them to produce an output. The final output is then passed through an activation function (such as, for example, ReLU, sigmoid, or hyperbolic tangent) to introduce non-linearity, which enables the network to model complex patterns.

Neural networks are typically trained through a process of backpropagation, where the system's predictions are compared against the known output, and a loss function is utilized to measure the difference between the prediction and the actual result. The network's weights can be adjusted through a process called gradient descent, which can be configured to minimize the loss function over time. However, the training process can be prone to problems such as overfitting (where the model performs well on the training data but poorly on new data). To counter this, techniques such as regularization (e.g., regularization, dropout), early stopping, and mini-batches can be utilized to prevent the network from becoming overly specialized to the training set.

CNNs are a specific type of ML neural network designed to work particularly well with power data, making them highly relevant for adaptive load sharing optimization, which may be subject to processing. As those skilled in the art will recognize, CNNs typically utilize specialized layers known as convolutional layers, which apply filters (also known as kernels) to the input data. These filters slide over the input (e.g., an input power value), detecting patterns such as edges or textures, which are then passed to the next layer for further processing. The advantage of CNNs is their ability to automatically learn and extract relevant features from raw data without the need for manual feature engineering. Furthermore, pooling layers (e.g., max-pooling or average pooling) are often added after convolutional layers to reduce the dimensionality of the data, helping to make the system more efficient while retaining the most important information. After several layers of convolutions and pooling, the CNN can output a prediction, such as determining load sharing percentages of the power stages for adaptively optimizing load sharing between multiple power stages of a power supply unit to minimize power consumption.

While CNNs are well-suited for grid-based data like images, many real-world problems can involve non-grid data, such as load sharing percentages, power interactions, or the like. This type of data may better be represented as a graph, where nodes represent entities (e.g., loads) and edges represent relationships between them (e.g., connections between the power stages and the loads). Thus, Graph Neural Networks (GNNs) can be utilized to operate on such graph-based data.

In GNNs, information is passed between nodes through edges in a process called message passing. This allows the network to capture dependencies and relationships within the graph structure. The key feature of GNNs is their ability to aggregate information from neighboring nodes, which is crucial in predicting properties that depend on the current/local structure, such as the behavior of dynamic load or the properties of a power supply unit.

Generative models aim to learn the underlying distribution of a dataset and generate new samples that resemble the original data. Two common types of generative models are Variational Autoencoders (VAEs) and Generative Adversarial Networks (GANs). VAEs are often configured to work by encoding data into a lower-dimensional latent space and then decoding it back into its original form. This allows for the generation of new data by sampling points from the latent space. This can be utilized when attempting to construct a graph based on loads and input power.

Similarly, GANs include two components: a generator that creates fake/generated data and a discriminator that tries to distinguish between real and fake data. The two components are trained in a competitive process where the generator tries to "fool" the discriminator, leading to increasingly realistic generated data. This type of process may be utilized to produce synthetic samples that resemble the training data, which can help augment the dataset.

Reinforcement Learning (RL) involves an agent learning to make decisions by interacting with an environment and receiving feedback (rewards or penalties) based on its actions. DRL combines RL with DL techniques, allowing agents to learn from high-dimensional inputs, such as images or complex power simulations.

In adaptive load sharing optimization, DRL can be used in scenarios where an optimal decision needs to be made, such as adaptively configuring load sharing settings of one or more power stages of a power supply unit based on the desired or current properties. The combination of RL and DL 230 can allow for learning from raw data, making it a powerful tool for dynamic and real-time decision-making for adaptive load sharing optimization.

Although a specific embodiment for various subsets of artificial intelligence suitable for carrying out the various steps, processes, methods, and operations described herein is discussed with respect to FIG. 2, any of a variety of systems and/or processes may be utilized in accordance with embodiments of the disclosure. For example, another subset may be present and available for use within AI 210. Those skilled in the art will recognize that the diagram 200 presented in FIG. 2 is simplified for illustration purposes and various methods and techniques may interact with other areas (ML 220 with DL 230, etc.). The elements depicted in FIG. 2 may also be interchangeable with other elements of FIG. 1 and FIGS. 3-9 as required to realize a particularly desired embodiment.

Figure 3:
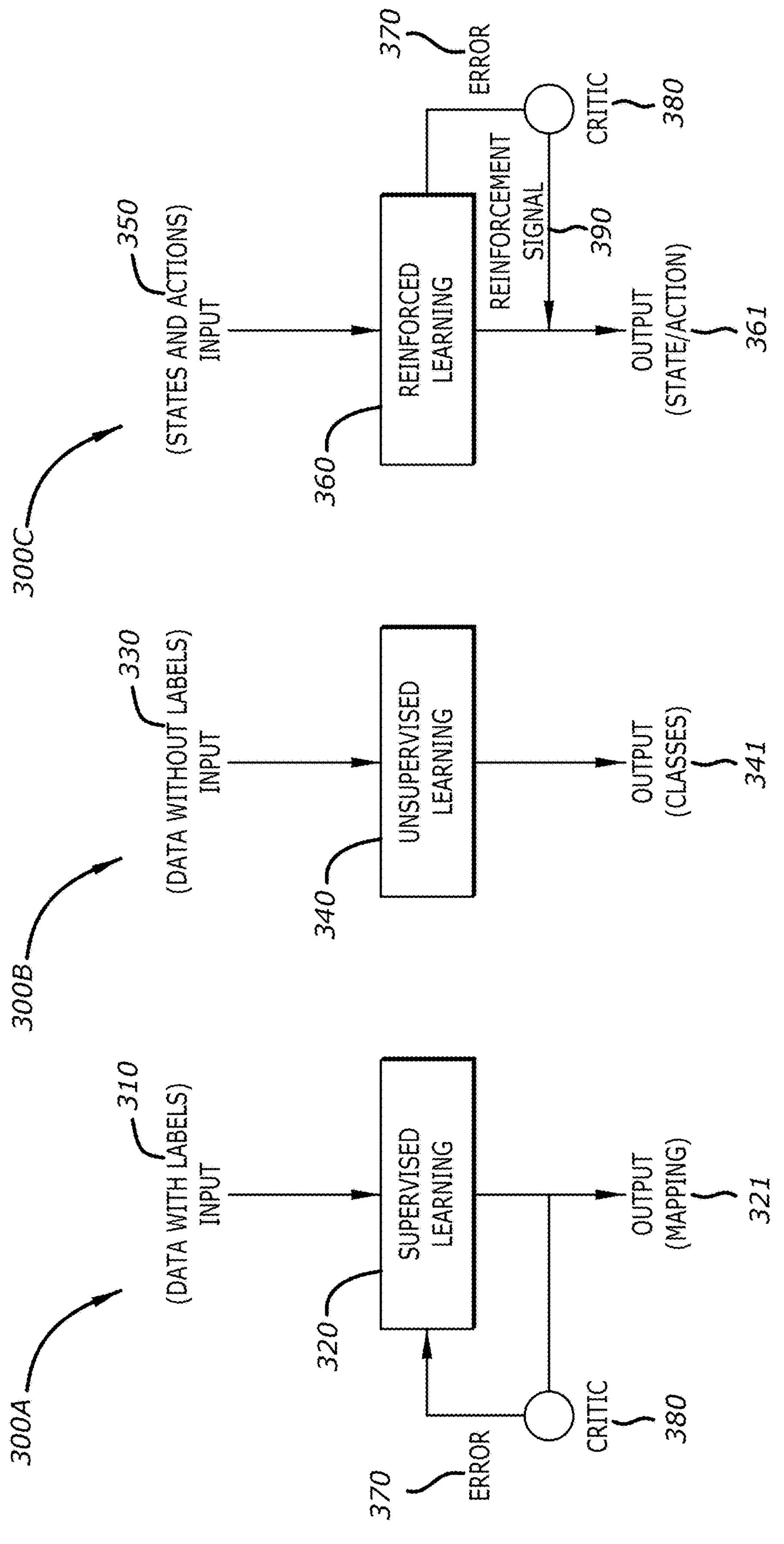
FIG. 3 is a block diagram illustrating different methods of machine-based learning in accordance with various embodiments of the disclosure.

Referring to FIG. 3, a block diagram illustrating different methods of machine-based learning in accordance with various embodiments of the disclosure is shown. In many embodiments, a machine learning model is defined as a mathematical representation of the output of the training process. A machine learning model is often considered similar to computer software designed to recognize patterns or behaviors based on previous experience or data. However, the learning algorithm can discover patterns within the training data, and output an ML model which can capture these patterns and make predictions on new data.

ML models can be understood as a device that has been trained to find patterns within new data and make predictions. These models can be represented as a complex mathematical function that would be impractical for a human to calculate that takes requests in the form of input data, makes predictions on input data, and then provides an output in response. First, these models can be trained over a set of data, and then they are provided an algorithm or other task to reason over data, extract the pattern from feed data, and learn from that data. Once the model(s) is/are trained, they can be used to predict a new and previously unseen dataset.

There are various types of machine learning models available based on different business goals and data sets available. Often, based on the desired application, ML models can be configured as or settle into one of three different model types: supervised learning, unsupervised learning, and/or reinforcement learning. Supervised learning can further be broken down into two categories of classification and regression. Likewise, unsupervised learning can be divided into three categories: clustering, association rule, and/or dimensionality reduction.

In the embodiment depicted in FIG. 3, a supervised learning system 300A is shown. The supervised learning system 300A can be configured with a supervised learning model 320 that accepts input data 310 and generates an output 321. However, the output data is often reviewed by a critic 380 that can determine one or more errors 370 that are fed back into the supervised learning model 320 for use in updating.

Supervised learning systems 300A are often considered the simplest machine learning model to understand in which input data (such as training data) has a known label or result as an output. The supervised learning model 320 can, therefore, be understood to work on the principle of input-output pairs. As such, a function can be trained using a training data set, which is then applied to unknown data to make some predictions. Supervised learning is task-based and mostly tested on labeled data sets.

Supervised learning systems 300A may often involve one or more regression problems. In regression problems, the output is a continuous variable. Some commonly used regression models include linear regression, decision trees, and random forests. Linear regression is typically the most straight forward machine learning model in which a prediction of one output variable is made using one or more input variables. The representation of linear regression can be processed as a linear equation, which combines a set of input values (denoted as x) and a predicted output (denoted as y) for the set of those input values. As those skilled in the art will recognize, this may be represented in the form of a line: $Y=bx+c$. A typical aim of a linear regression-based model can be to find the optimal fit line that best fits the available data points. Linear regression can be extended to multiple linear regressions (finding a plane of best fit in higher dimensional space) and polynomial regressions (finding the best fit curve).

Decision trees are also popular machine learning models that can be utilized for both regression and classification problems. A decision tree utilizes a tree-like structure of decisions along with their possible consequences and outcomes. In this, each internal node is utilized to represent a test on an attribute while each branch is used to represent the outcome of the test. The more nodes a decision tree has, the more accurate the result will be. This may be utilized when making decisions related to loads and their separation. The advantage of decision trees is that they are intuitive and easy to implement, but may lack accuracy depending on the available computational or time resources available.

Random forests are an ensemble learning method, which may include a large number of decision trees. For example, each decision tree in a random forest predicts an outcome, and the prediction with the majority of votes is considered as the outcome. A random forest model can be used for both regression and classification problems. For the classification task, the outcome of the random forest may be taken from the majority of votes. Whereas in the regression task, the outcome can be taken from the mean or average of the predictions generated by each tree.

Classification models are the other type of supervised learning, which can be used to generate conclusions from observed values in one or more categorical forms. For example, a classification model can identify if an email is spam or not; whether a load profile is peak, average, or low demand, etc. Classification algorithms can also be used to predict between two or more classes and/or categorize an output into different groups. For these classification systems, a classifier model can be designed that classifies the dataset into different categories, and each category can subsequently be assigned a label. As those skilled in the art will recognize, there are currently two main types of classifications in machine learning: binary and multi-class. Binary classification can be utilized when there are only two possible classes (i.e., yes/no, dog/cat, etc.). Multi-class classification can be utilized when there are more than two possible classes, thus requiring a multi-class classifier.

One of the potential classification processes is logistic regression. Logistic regression can be used to solve various classification problems in machine learning systems. These processes are similar to linear regression but are often used to predict categorical variables. While some variations can be configured to generate a prediction as an output in either "yes" or "no", 0 or 1, "true" or "false", etc. However, in a number of embodiments, the system can instead be configured to not give exact values, but instead provide probabilistic values between zero and one, etc.

Another classification process that can be utilized is a support vector machine (SVM) which is widely used for classification and regression tasks. However, the main aim of SVM is to find the best decision boundaries in an N-dimensional space, which can be utilized to segregate data points into classes, and generate a best decision boundary often known as a hyperplane. SVM processes can select the extreme vector to find a hyperplane, wherein these vectors are known as support vectors.

Naïve Bayes is another popular classification algorithm used in machine learning. This process receives its name as it is based on Bayes theorem and follows the naïve (independent) assumption between the features which is often given as the formula:

$$P(y \mid X) = \frac{P(X \mid y) * P(y)}{P(X)}$$

This formula takes a class or target y and a predictor attribute (X) and calculates a posterior probability P(y|X) of that class given a particular predictor. P(y) is the prior probability of that class, P(X) is the prior probability of the predictor, and P(X|y) is the likelihood or probability of the predictor given the class. As those skilled in the art will recognize, this may be more succinctly understood as the posterior chance being a result of the prior results times the likelihood divided by the evidence available. Each naïve Bayes classifier assumes that the value of a specific variable is independent of any other variable/feature. For example, if a fruit needs to be classified based on color, shape, and taste, yellow, oval, and sweet will be recognized as mango. Here each feature is independent of other features. Likewise, various embodiments herein can classify load profiles into categories such as peak, average, or low demand, etc.

Again, in the embodiment depicted in FIG. 3, an unsupervised learning system 300B is shown. The unsupervised learning system 300B can be configured with an unsupervised learning model 340 that accepts input data 330 and generates an output 341. Unlike other model types, there are no critics or error signals to process. Unsupervised learning models 340 can implement the learning process opposite to supervised learning, which means it enables the model to learn from an unlabeled training dataset. Based on the unlabeled dataset, the unsupervised learning model 340 can predict the output. Using an unsupervised learning system 300B, the unsupervised learning model 340 can learn hidden patterns from the dataset by itself without any supervision. In a variety of embodiments, unsupervised learning models 340 are often utilized to perform tasks involving clustering, association rule learning, and/or dimensional reduction.

Clustering is an unsupervised learning technique that involves clustering or grouping the available data points into different clusters based on similarities and/or differences. The objects or data points with the most similarities remain in the same group, and they have no or very few similarities from other groups. Clustering algorithms can be used in a variety of different tasks such as, but not limited to image segmentation, statistical data analysis, market segmentation, and the like. Some commonly used clustering algorithms that can be selected include K-means clustering, hierarchal clustering, Density-based Spatial Clustering of Applications with Noise (DBSCAN), etc.

Association rule learning is an unsupervised learning technique which finds unique relations among variables within a large data set. In various embodiments, a primary aim of this type of learning algorithm is to find the dependency of one data item on another data item and map those variables accordingly so that it can satisfy some desired outcome. For example, in more embodiments, an association rule system may be utilized to group loads into clusters and categorize them. This algorithm can be applied in market basket analysis, web usage mining, continuous production, etc. However, those skilled in the art will recognize that other scenarios may be available based on the desired application. Some popular algorithms of association rule learning are Apriori Algorithm, Eclat, and Frequent Pattern (FP)-growth algorithm.

In additional embodiments, the number of features/variables present in a dataset can be understood as the dimensionality of the dataset, and the technique used to reduce the dimensionality is known as a dimensionality reduction technique. Although more data provides more accurate results, it can also affect the performance of the model/algorithm, such as yielding overfitting outcomes, etc. In such cases, dimensionality reduction techniques can be utilized. It is often desired that this process involves converting the higher dimensions dataset into lesser dimensions dataset while also ensuring that the ensuing results provide similar information. Different dimensionality reduction methods can be utilized, such as, but not limited to, Principal Component Analysis (PCA), Singular Value Decomposition (SVD), etc.

Further, in the embodiment depicted in FIG. 3, a reinforcement learning system 300C is shown. The reinforcement learning system 300C can be configured with a reinforcement learning model 360 that accepts input data 350 and generates an output 361. In reinforcement learning, the reinforcement learning model 360 learns actions for a given set of states that lead to a goal state. In the embodiment depicted in FIG. 3, a critic 380 can receive or otherwise notice an error 370 within the reinforcement learning model 360 actions, and transmit a reinforcement signal 390 to adjust the outcome/output such that the "reward" or "punishment" is adjusted to better model the future behaviors or processing of the reinforcement learning model 360.

The reinforcement learning model 360 is a feedback-based learning model that can take feedback signals after each state or action by interacting with the environment. This feedback works as a reward (positive for each good action and negative for each bad action), and the agent's goal is to maximize the positive rewards to improve their performance. The behavior of the model in reinforcement learning is similar to human learning, as humans learn things by experiences as feedback and interact with the environment. Popular methods of reinforcement learning including q-learning, State-Action-Reward-State-Action (SARSA), and deep Q network.

Q-learning is one of the popular model-free algorithms of reinforcement learning, which is based on the Bellman equation. It often aims to learn the policy that can help the AI agent to take the best action for maximizing the reward under a specific circumstance. It can incorporate Q values for each state-action pair that indicate the reward to following a given state path, and it tries to maximize that Q-value.

SARSA is an on-policy algorithm based on the Markov decision process. In further embodiments, it can use the action performed by the current policy to learn the Q-value. The SARSA algorithm stands for State Action Reward State Action, which symbolizes the tuple (s, a, r, s', a'). Deep Q neural networking (or DQN) is Q-learning within a neural network. It can be deployed within a big state space environment where defining a Q-table would be a complex task. So, in these embodiments, rather than using a Q-table, the neural network instead utilizes Q-values for each action based on the state.

In still more embodiments, the devices and methods discussed herein may employ a multivariate optimization algorithm, for example, gradient descent, for determining optimum load sharing settings to minimize power consumption in an electronic device. Gradient descent may refer to an optimization algorithm utilized to determine the minimum of a function. In the context of optimizing load-sharing settings to minimize power consumption, by way of a non-limiting example, in still further embodiments, gradient descent may be applied to adjust the load-sharing percentages among various power stages as follows. In step 1, to initiate minimization of a total power consumption PPP based on the load-sharing percentages $x_1$, $x_2$, and $x_3$ among three power stages, the algorithm may set initial even load-sharing percentages as: $x_1=x_2=x_3=1/3$ (or 33.33%).

In step 2, the algorithm may formulate an objective function $P(x_1,x_2,x_3)$ that may represent the power consumption based on the load-sharing percentages. For purposes of illustration, a linear relationship as follows may be assumed (though real systems may require more complex modeling):

$$P(x_1, x_2, x_3) = 900 - (x_1 + x_2 + x_3) * \text{Efficiency Factor}$$

where,

"Efficiency Factor" may be a constant based on historical performance data.

In step 3, the algorithm may start with the following example initial values for the load-sharing percentages. For even load sharing: $x_1=0.33$, $x_2=0.33$, and $x_3=0.34$.

In step 4, the algorithm may calculate the gradient of the power consumption function with respect to each load-sharing percentage. The gradient VP may be expressed as:

$$\nabla P = \left(\frac{\partial P}{\partial x1}, \frac{\partial P}{\partial x2}, \frac{\partial P}{\partial x3}\right)$$

In an example, the partial derivative may be derived from the power consumption function, reflecting how a change in each $x_i$ affects the total power consumption.

In step 5, the algorithm may update each load sharing percentage by utilizing the calculated gradients. The update rule for each percentage can be expressed as follows:

$$x_i \leftarrow x_i - \alpha * \frac{\partial P}{\partial xi}$$

where,

α may refer to the learning rate, controlling how much to change each percentage in response to the gradient.

After updating, in step 6, the algorithm may determine whether the load sharing percentages remain valid (i.e., they should sum to 1). If necessary, the algorithm may normalize the load sharing percentages: $\text{Total}=x_1+x_2+x_3$. The algorithm may then perform an adjustment as follows:

$$x_1 \leftarrow \frac{x_1}{\text{Total}}, x_2 \leftarrow \frac{x_2}{\text{Total}}, x_3 \leftarrow \frac{x_3}{\text{Total}}$$

In step 7, the algorithm may repeat the process of calculating the gradient, updating the percentages, and checking for convergence. A threshold may be set for how small the change in power consumption should be before stopping the algorithm. Consider an example calculation as follows:

1. Initial load sharing:

Baseline Consumption: 900 W

Initial percentages: $x_1=0.33$, $x_2=0.33$, and $x_3=0.34$

2. Calculate initial power consumption:

P(0.33,0.33,0.34)=900 W

3. Gradient calculation: Assume the calculated gradients are as follows:

$$\frac{\partial P}{\partial x1} = 5; \frac{\partial P}{\partial x2} = -3; \frac{\partial P}{\partial x3} = 2$$

4. Learning rate:

$$\text{Set } \alpha = 0.01$$

5. Update load sharing percentages:

$$x_1 \leftarrow 0.33 - 0.01 * 5 = 0.28$$

$$x_2 \leftarrow 0.33 - 0.01 * (-3) = 0.36$$

$$x_3 \leftarrow 0.34 - 0.01 * 2 = 0.32$$

6. Normalization:

$$\text{Total} = 0.28 + 0.36 + 0.32 = 0.96$$

Normalize:

$$x_1 = \frac{0.28}{0.96} \approx 0.292,\ x_2 = \frac{0.36}{0.96} \approx 0.375,\ x_3 = \frac{0.32}{0.96} \approx 0.333$$

7. The algorithm may iterate the process, recalculate the gradient, update the load sharing percentages, and normalize until the total power consumption approaches the target of a minimum power consumption, for example, 885 W, while ensuring that one or more safety thresholds associated with the electronic device are met.

Although a specific embodiment for different methods of machine-based learning suitable for carrying out the various steps, processes, methods, and operations described herein is discussed with respect to FIG. 3, any of a variety of systems and/or processes may be utilized in accordance with various embodiments of the disclosure. For example, those skilled in the art will recognize that methods of learning described herein are generalized and may incorporate other types developed as well as a combination of one or more methods based on the goals of the desired application. The elements depicted in FIG. 3 may also be interchangeable with other elements of FIGS. 1-2 and FIGS. 4-9 as required to realize a particularly desired embodiment.

Figure 4:
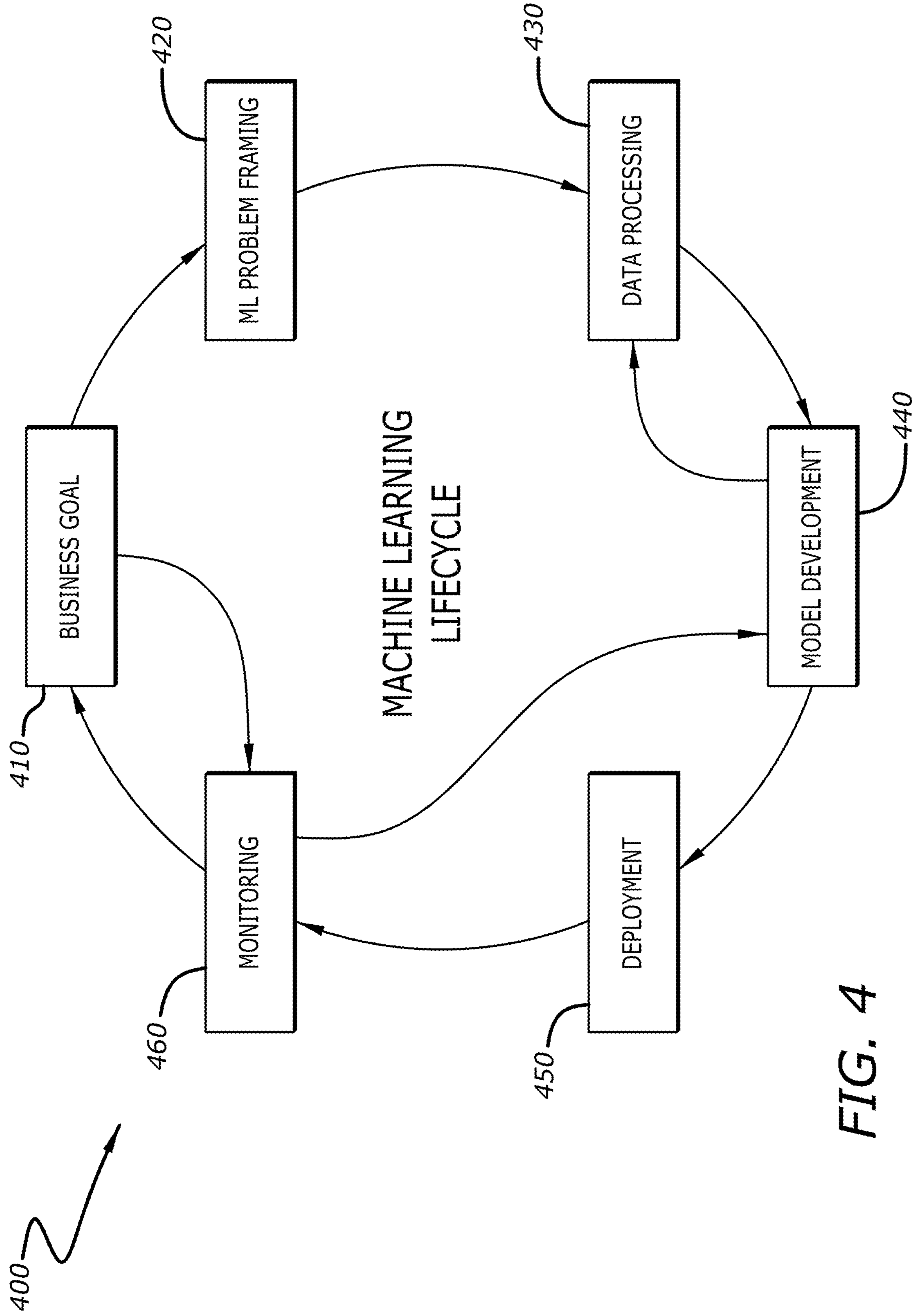
FIG. 4 is a block diagram illustrating a machine learning lifecycle in accordance with various embodiments of the disclosure.

Referring to FIG. 4, a block diagram illustrating a machine learning lifecycle 400 in accordance with various embodiments of the disclosure is shown. During the development of machine learning systems, the embodiment depicted in FIG. 4 can provide a framework for how to structure the design and maintenance of these systems. This machine learning lifecycle 400 outlines various stages involved in building, deploying, and improving ML models to solve real-world problems. By following this structured process, businesses and organizations can ensure that their machine learning projects align with strategic goals, use data effectively, and adapt to changing conditions over time. This machine learning lifecycle 400 emphasizes that developing a machine learning model is not a one-time effort but an iterative process requiring ongoing monitoring and adjustment. The feedback loop inherent in the machine learning lifecycle 400 allows for continual refinement and optimization of models to maintain their accuracy and relevance.

In many embodiments, a first stage of the machine learning lifecycle 400 is identifying the business goal 410, which sets the overall direction and purpose of the ML project. This can involve understanding the specific problems or opportunities within the business or project that machine learning can address. A clear business goal 410 ensures that the project remains focused on delivering tangible value, whether it is determining optimal power distribution or adaptively optimizing load sharing to minimize power consumption. Without a well-defined goal, it can be challenging to align the subsequent stages of the ML lifecycle 400, as the choice of model, data processing methods, and performance metrics can all depend on what the business aims to achieve.

Establishing a proper business goal 410 can also involve engaging with key stakeholders and developers to gather requirements and set success criteria. It can provide a roadmap that outlines what success looks like and helps in framing the ML problem. For example, if the goal is to minimize the total power consumption based on the load-sharing percentages, the project might focus on building a predictive model that utilizes total power consumption as input for adaptively configuring the load-sharing percentages of the power stages to achieve minimum power consumption. Clearly defined goals not only help guide the project but also provide benchmarks for evaluating the effectiveness of the deployed model once it enters production.

Once the business goal 410 is established, various embodiments take a next step involving ML problem framing 420, wherein the goal is translated into a specific machine learning task. This can involve selecting the appropriate type of ML problem, such as classification, regression, clustering, or recommendation, and defining the target variables or outputs. For example, if the goal is to minimize the total power consumption, the problem can be framed as a regression task where the model treats load sharing percentages of the phases as variables and power consumption as a metric for optimization on specific hardware running a particular application at any given time. Proper problem framing can be important as it determines the particular data requirements, choice of model, and evaluation metrics.

During this stage, it is also prudent to consider the constraints and assumptions that may affect the model's development. This may include, for example, data availability, computational resources, ethical considerations, or regulatory compliance. Properly framing the problem ensures that the model development aligns with the business's needs and that the problem is broken down into manageable steps, ultimately increasing the project's chances of success.

Data processing 430 is a step in many embodiments where raw data is collected, cleaned, and transformed into a format suitable for machine learning. This step can involve gathering data from various sources, removing errors or inconsistencies, handling missing values, and normalizing or scaling features to ensure that the model can learn effectively. Feature engineering is often a part of this stage, where new features are derived from the raw data to capture more relevant information and improve model performance.

The quality and preparation of the utilized data can significantly impact the model's accuracy and reliability. Inadequate or poorly processed data can lead to biased or inaccurate predictions, no matter how advanced the model is. Hence, data processing 430 can require or at least benefit from careful planning and iterative refinement. Once the data is processed, it is typically split into training, validation, and test sets to develop and evaluate the model, ensuring that it generalizes well to new, unseen data.

Model development 440 is a phase, in a number of embodiments, where machine learning algorithms are selected, trained, and refined to create a model that addresses the framed problem. This stage can involve choosing the appropriate algorithm (e.g., decision trees, neural networks, support vector machines), setting up the model's architecture, and defining hyperparameters that will guide the training process. The model is trained on the processed data to identify patterns and relationships that allow it to make predictions or decisions.

During model development 440, the model can be evaluated using the validation dataset to fine-tune its parameters and improve performance. Techniques like cross-validation, regularization, and hyperparameter tuning can be used to prevent overfitting and ensure the model generalizes well. If proper steps are taken, the result is a model that, once it meets predefined performance metrics, is ready for deployment in a real-world environment. However, this process often involves several iterations to optimize the model for the specific business goal, indicated by the arrow back to data processing 430.

In further embodiments, deployment 450 is the stage where the developed model is integrated into the production environment to perform its intended tasks. This phase may involve setting up the necessary infrastructure, such as Application Programming Interfaces (APIs) or cloud-based services, to allow the model(s) to process live data and generate predictions. Deployment 450 can transform the model from a research tool into a functional component of a business process or product, providing real-time insights, automations, or decisions.

Proper deployment 450 can also include setting up mechanisms for logging, error handling, and user access. Since real-world environments are often dynamic and differ from training conditions, deployment may require continuous adaptation and updates to ensure the model(s) operates efficiently. This step can be important because a model's success is not only determined by its performance metrics but also by its ability to provide actionable results that align with the business goal 410.

In more embodiments, monitoring 460 is the ongoing process of tracking the model's performance and behavior after deployment. It involves collecting data on the model's predictions, accuracy, latency, and error rates to detect issues such as concept drift, where changes in the underlying data patterns can degrade the model's accuracy. By continuously monitoring 460, teams can identify when the model's performance drops and requires retraining or adjustments to align with the evolving data.

Monitoring 460 can also encompass aspects such as user feedback, security, and compliance, ensuring that the model remains effective, reliable, and ethical in its application. It may serve as the feedback loop in the lifecycle, where insights gained from monitoring feed back into the earlier stages, particularly data processing 430 and model development 440, to refine the model(s) as needed. This iterative process allows the machine learning system to adapt and maintain its alignment with the original business goal 410 over time.

Although a specific embodiment for a machine learning lifecycle suitable for carrying out the various steps, processes, methods, and operations described herein is discussed with respect to FIG. 4, any of a variety of systems and/or processes may be utilized in accordance with embodiments of the disclosure. For example, the particular route of development of the model(s) may not follow this cycle completely. As those skilled in the art will recognize, there are a variety of ways to develop AI products that include various iterative steps that aide in development and refinement of different model(s). The elements depicted in FIG. 4 may also be interchangeable with other elements of FIGS. 1-3 and FIGS. 5-9 as required to realize a particularly desired embodiment.

Figure 5:
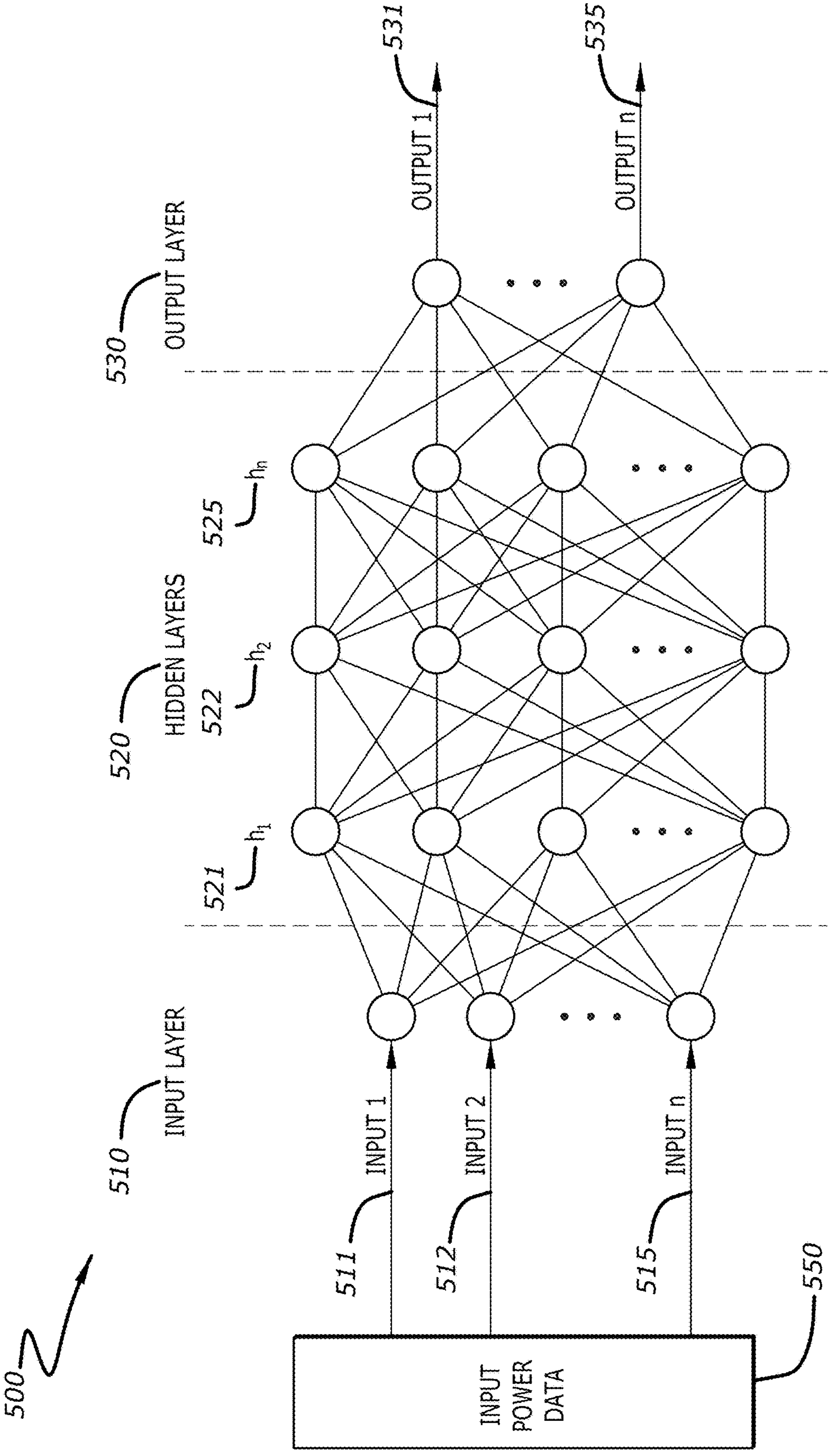
FIG. 5 is a schematic diagram illustrating an exemplary neural network in accordance with various embodiments of the disclosure.

Referring to FIG. 5, a schematic diagram illustrating an exemplary neural network 500 in accordance with various embodiments of the disclosure is shown. The embodiment depicted specifically depicts a feedforward neural network with multiple layers. This type of network includes an input layer 510, one or more hidden layers 520, and an output layer 530. Each layer contains nodes (or neurons) that are interconnected, representing how data flows through the network. The input layer 510 can receive raw data, which is then processed by the hidden layers 520 through weighted connections and activation functions. These hidden layers 520 can enable the network to learn complex patterns and relationships within the data.

The final output layer 530 produces the network's predictions or classifications based on the processed input. The interconnected nature of the nodes allows the neural network 500 to learn from data during training by adjusting the weights of connections to minimize prediction errors. This structure is the foundation of deep learning models, as adding more hidden layers 520 can create a deep neural network, capable of tackling highly complex tasks such as image recognition, natural language processing, and pattern detection in large datasets.

A perceptron or a single artificial neuron is the building block of artificial neural networks (ANNs) and can perform forward propagation of information. For a set of inputs to the perceptron, weights (and biases to shift wights) can be assigned. These inputs and weights can be multiplied out correspondingly together to get a sum output. Those skilled in the art will recognize tools such as, but not limited to, PyTorch, Tensorflow, and MXNet as training packages for common neural network tasks. However, it is contemplated that other tools may be developed specifically for the neural network tasks related to the embodiments described herein.

In many embodiments, the weight matrices of a neural network can be initialized randomly or obtained from a pre-trained model. These weight matrices can be multiplied with the input matrix (or output from a previous layer) and subjected to a nonlinear activation function to yield updated representations, which are often referred to as activations or feature maps. The loss function (also known as an objective function or empirical risk) can often be calculated by comparing the output of the neural network and the known target value data.

Feedforward networks, such as the neural network 500 depicted in the embodiment of FIG. 5, are often configured as neural networks where information moves in one direction, from the input layer through the hidden layers to the output layer, without any cycles or loops. They are primarily used for tasks such as classification, regression, and simple pattern recognition, where each input is processed independently of others. In contrast, backpropagation is not a separate type of network but rather a training algorithm commonly utilized in both feedforward and other types of networks such as recurrent neural networks (RNNs).

Backpropagation involves adjusting the weights of the network in the reverse direction (from output to input) based on the error between the predicted output and the actual target during training. While feedforward describes the structure and data flow within the network, backpropagation is a technique used to optimize the model. Feedforward networks are ideal for straightforward tasks where input-output relationships are not sequential or time-dependent. However, for problems involving learning complex patterns over time, such as speech recognition or time-series analysis, networks that leverage backpropagation for training such as RNNs or deep feedforward networks with many hidden layers, become necessary to capture these intricate dependencies.

Typically, in these network arrangements, the weights are iteratively updated via various methods including, but not limited to, stochastic gradient descent algorithms to help minimize the loss function until the desired accuracy is achieved. Most modern deep learning frameworks can facilitate this by using reverse-mode automatic differentiation to obtain the partial derivatives of the loss function with respect to each network parameter through recursive application of the chain rule. Colloquially, this is also known as back-propagation. Common gradient descent algorithms can include, but are not limited to, Stochastic Gradient Descent (SGD), Adam, Adagrad etc. The learning rate is an important parameter in gradient descent. Except for SGD, all other methods use adaptive learning parameter tuning. Depending on the objective such as classification or regression, different loss functions such as Binary Cross Entropy (BCE), Negative Log Likelihood Loss (NLLL) or Mean Squared Error (MSE) can be used.

Neural network architecture is commonly used for a wide range of tasks in fields such as computer vision, natural language processing, financial forecasting, and materials science. For instance, it can be employed to recognize patterns in images, such as identifying objects or faces, or to classify text into categories, like spam detection in emails. It is also useful in regression problems, such as predicting stock prices or energy consumption, where input features can be processed to output continuous values. However, this is a general example of an AI model, illustrating how a feedforward neural network works. Depending on the problem, other methods and models may be more appropriate. For example, CNNs are often used for image processing tasks, while RNNs are suitable for sequential data like time series data or text. Additionally, simpler models like linear regression, decision trees, or SVMs may be sufficient if the problem is less complex, or the dataset is relatively small. The embodiment depicted in FIG. 5 is presented as an exemplary ML solution that may be deployed within one or more methods or systems described herein.

In a number of embodiments, the input layer 510 is the first layer in a neural network 500 and serves as the initial point where raw data is introduced into the model. Each node (or neuron) in this layer represents an individual feature or variable from the dataset, allowing the network to receive and process various types of data, such as pixel values in an image, numerical features in a spreadsheet, or words in a text document. For instance, in image recognition tasks, the input layer can consist of nodes that correspond to the pixel values of the image, providing the network with the visual information needed to identify objects or patterns. The number of nodes in the input layer directly depends on the number of features present in the dataset. If there are one-hundred features in the data, the input layer will typically have one-hundred nodes, each conveying one piece of the information to the subsequent layers. In a variety of embodiments, the inputs of the neural network 500 are generally scaled i.e., normalized to have a zero mean and/or unit standard deviation. Scaling can also be applied to the input of hidden layers (using batch or layer normalization) to improve the stability of neural network 500.

Unlike the hidden layers 520 and output layers 530, the input layer 510 typically does not perform any computations or transformations on the data. Its primary function is often to pass the input data to the next layer in the network, the first hidden layer 521. However, it is often desired that the data fed into this layer is preprocessed appropriately, such as being normalized or standardized, to ensure that the neural network can learn efficiently. Proper preprocessing, like scaling numerical values or encoding categorical variables, can help the network process data uniformly, facilitating more stable and faster convergence during training.

The input layer's design depends on the nature of the problem. For example, in natural language processing, the input layer may represent words encoded as numerical vectors, while in time-series analysis, each node might represent a data point in a sequence. While the input layer 510 itself does not modify the data, it sets the stage for the neural network to extract complex patterns and relationships through the deeper layers. This flexibility in handling various types of input make the neural network 500 a powerful tool for a diverse set of applications.

With respect to the embodiments described herein, the input layer may be configured with a plurality of inputs providing input power data 550. For example, a model can be configured with a first input 511 configured as input power data associated with one power stage, a second input 512 is configured with input power data associated with another power stage, while additional inputs can be added related to the number of power stages in the power supply unit. The nth input 515 can be configured in various embodiments to include the current power stage such that a determination to keep the current power stage in place may be possible. However, as those skilled in the art will recognize, additional setups can be configured such that the inputs can be configured to also include different parameters such as hardware characteristics of an electronic device operably coupled to the power stages, one or more environmental conditions proximate to the electronic device, one or more applications running on the electronic device, or power distribution losses in the electronic device, among other input types, etc.

In more embodiments, the neural network 500 comprises a plurality of hidden layers 520. The embodiment depicted in FIG. 5 comprises a first hidden layer 521, a second hidden layer 522, and an nth hidden layer 525, which are denoted as $h_1$, $h_2$, and $h_n$ respectively. In additional embodiments, the hidden layers 520 are disposed where the core of the model's learning and pattern recognition occurs. In each hidden layer, individual neurons receive inputs from the previous layer, apply a set of weights, add a bias, and pass the result through an activation function (e.g., ReLU, leaky ReLU, sigmoid, hyperbolic tangent (tanh), Swish, etc.). This process can introduce non-linearity, allowing the network to capture complex patterns in the data that simple linear models cannot. The intricate web of connections among neurons across layers helps the network transform and process input features into representations that become progressively more abstract and useful for making predictions.

The first hidden layer 521$h_1$ receives direct input from the input layer, transforming the raw data into an initial set of features. For example, in an image recognition task, this layer might begin identifying basic patterns, such as edges or simple textures. The output of the first hidden layer 521 is then passed to a second hidden layer 522$h_2$, which builds upon the features identified by the first hidden layer 521. This deeper layer might start recognizing more complex patterns, such as shapes or specific object components, by combining the lower-level features identified earlier. This can continue until a last, nth hidden layer 525$h_n$ continues this abstraction process, allowing the network to recognize even higher-level, more detailed features, such as identifying an entire object within an image or understanding intricate relationships in the input data.

Each hidden layer adds a level of complexity and abstraction to the network's learning capabilities. The multi-layer structure can enable the network to move from recognizing simple patterns in the first input layer 521 to highly complex, abstract concepts in the deeper layers. The number of hidden layers and neurons within them can vary depending on the problem's complexity. More hidden layers generally allow the network to model more intricate functions, making deep neural networks especially effective for tasks like image recognition, natural language processing, and complex predictive modeling. However, adding more layers also increases the computational demand and the risk of overfitting, highlighting the need to carefully design and tune these hidden layers for optimal performance.

In further embodiments, the output layer 530 is often the final layer in a neural network and is responsible for producing the network's predictions or classifications based on the information processed through the previous hidden layers 520. Each neuron in the output layer 530 can represent a specific outcome or category that the model can predict. In the embodiment depicted in FIG. 5, the outputs are labeled as "output 1" 531 to "output n" 535, indicating that the network can be designed to have a varying number of outputs depending on the nature of the problem being solved for. For example, in a binary classification, there would typically be a single output neuron that provides a probability score for one of the two classes/outcomes. In contrast, for multi-class classification (e.g., categorizing loads for determining optimal load sharing settings), the output layer would contain multiple neurons, each corresponding to a different class.

The number of neurons in the output layer 530 can also designed specifically for other types of tasks, such as regression, where the model can predict continuous values. In such cases, the output layer 530 might contain a single neuron representing a numerical prediction, such as the price of a house or the temperature forecast, etc. Alternatively, in complex applications like multi-label classification (where each input can belong to multiple classes simultaneously), the output layer 530 could have multiple neurons, each representing a different class, with each neuron outputting a probability of the input belonging to that specific class.

The activation function used in the output layer can vary based on the desired output. For binary classification, a sigmoid function is commonly used to produce a probability between 0 and 1. For multi-class classifications, a softmax function can be applied to output a set of probabilities that sum to 1, indicating the most likely class. For regression problems, a linear activation function is often used to output a continuous range of values. The flexibility in designing the output layer allows the neural network 500 to be applied to a wide variety of tasks, from simple binary decisions to complex multi-output predictions, making them a versatile tool in artificial intelligence and machine learning.

Although a specific embodiment for an exemplary neural network suitable for carrying out the various steps, processes, methods, and operations described herein is discussed with respect to FIG. 5, any of a variety of systems and/or processes may be utilized in accordance with embodiments of the disclosure. For example, real-world neural networks are often far more complex, featuring many more layers, nodes, and connections than the simplified structure shown in the embodiment depicted in FIG. 5, which is an illustrative example meant to make it easier to explain the basic concepts of neural networks and how they process information. The specific features and functions described herein are not intended to be limiting to this specific embodiment. The elements depicted in FIG. 5 may also be interchangeable with other elements of FIGS. 1-4 and FIGS. 6-9 as required to realize a particularly desired embodiment.

Figure 6:
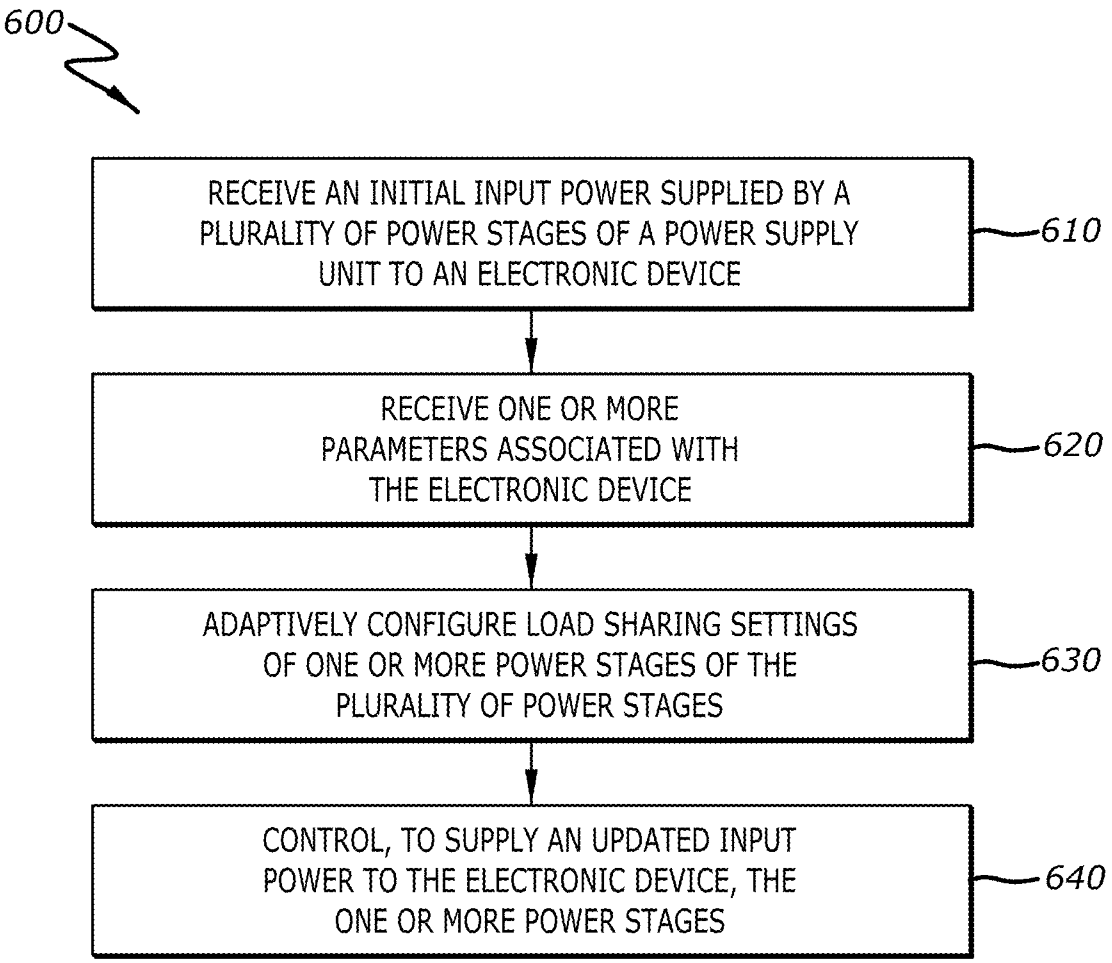
FIG. 6 is a flowchart depicting a process for adaptively optimizing load sharing in accordance with various embodiments of the disclosure.

Referring to FIG. 6, a flowchart depicting a process 600 for adaptively optimizing load sharing in accordance with various embodiments of the disclosure is shown. In many embodiments, the process 600 may receive an initial input power supplied by a plurality of power stages of a power supply unit to an electronic device (block 610). In a number of embodiments, the power stages may be operably coupled to a plurality of locations of the electronic device. The electronic device may, for example, be a multi-pin electronic device, a microprocessor, an NPU, a GPU, a CPU, an ASIC, any other integrated circuit, or a combination thereof. In a variety of embodiments, the initial input power may correspond to a total power consumption of the electronic device. In various embodiments, the process 600 may receive the sum of the power consumption by each of the locations of the electronic device as the initial input power.

In more embodiments, the process 600 may receive one or more parameters associated with the electronic device (block 620). In additional embodiments, the parameters may include one or more hardware characteristics of the electronic device. In addition to datasheet specifications, the hardware characteristics may include, for example, unique hardware variations that can occur in individual components of the electronic device. In further embodiments, the parameters may include one or more environmental conditions proximate to the electronic device. The environmental conditions may include, for example, temperature conditions, hot spots, moisture levels, vibrations, shocks, surrounding magnetic fields from other components, dust, airborne particles, electrostatic discharge, radiation, or the like. In still more embodiments, the parameters may include one or more applications, for example, networking applications, running on the electronic device. In still further embodiments, the parameters may include power distribution losses in the electronic device. The process 600 may receive the one or more parameters from the electronic device or one or more sensors associated with the electronic device.

In still additional embodiments, the process 600 may adaptively configure load sharing settings, for example, load sharing percentages, of one or more power stages of the plurality of power stages (block 630). The process 600 may adaptively configure load sharing settings of the power stages based on the received initial input power. The process 600 may also adaptively configure the load sharing settings of the power stages based on the received parameters. In some more embodiments, the process 600 may adaptively configure the load sharing settings of the power stages based on load behavior of the power stages. In yet various embodiments, the process 600 may determine the load sharing settings of the power stages based on a machine learning model. In yet more embodiments, the machine learning model may be employed in conjunction with a multivariate optimization algorithm, for example, gradient descent, for determining optimum load sharing settings to minimize power consumption. In still yet more embodiments, the adaptive configuration of the load sharing settings of the power stages may be performed in real time or near real time. In one or more embodiments, adaptive configuration of the load sharing settings may include iteratively adjusting the load sharing settings of the power stages by using the input power consumption from a previous iteration as a feedback until the input power consumption converges to a minimum input power consumption.

In many further embodiments, the process 600 may control, to supply an updated input power to the electronic device, the one or more power stages (block 640). The updated input power may correspond to a total power consumption of the electronic device. The updated input power may be less than the initial input power. In many additional embodiments, the process 600 may control the power stages based on the adaptively configured load sharing settings. In still yet further embodiments, the process 600 may vary phase currents supplied by the power stages to the electronic device based on the load sharing settings. In still yet additional embodiments, the power stages may exhibit uneven load sharing based on the adaptively configured load sharing settings and may accordingly supply the updated input power to the electronic device. In an example scenario, shifting of hotspots within the electronic device may indicate change in activity levels within the electronic device and may result in a change in power distribution losses. Further, operating the power stages at even load sharing may not always result in a minimum power consumption configuration. Thus, by adaptively configuring the load sharing settings based on changing parameters associated with the electronic device, the process 600 may reduce the total power consumption of the electronic device to a minimum value. In numerous embodiments, the process 600 depicted by the flowchart in FIG. 6 may be a closed-loop process which monitors the one or more parameters in real time or near real time. Thus, if any of the one or more parameters vary, the process 600 may be repeated to adapt to these parameter variations and minimize the total power consumption.

Although a specific embodiment for a process 600 for adaptively optimizing load sharing suitable for carrying out the various steps, processes, methods, and operations described herein is discussed with respect to FIG. 6, any of a variety of systems and/or processes may be utilized in accordance with embodiments of the disclosure. For example, instead of a controller, the electronic device itself may receive and collect the initial input power and parameters associated with the various locations of the electronic device and adaptively configure load sharing settings of one or more power stages of the power supply unit. The elements depicted in FIG. 6 may also be interchangeable with other elements of FIGS. 1-5 and FIGS. 7-9 as required to realize a particularly desired embodiment.

Figure 7:
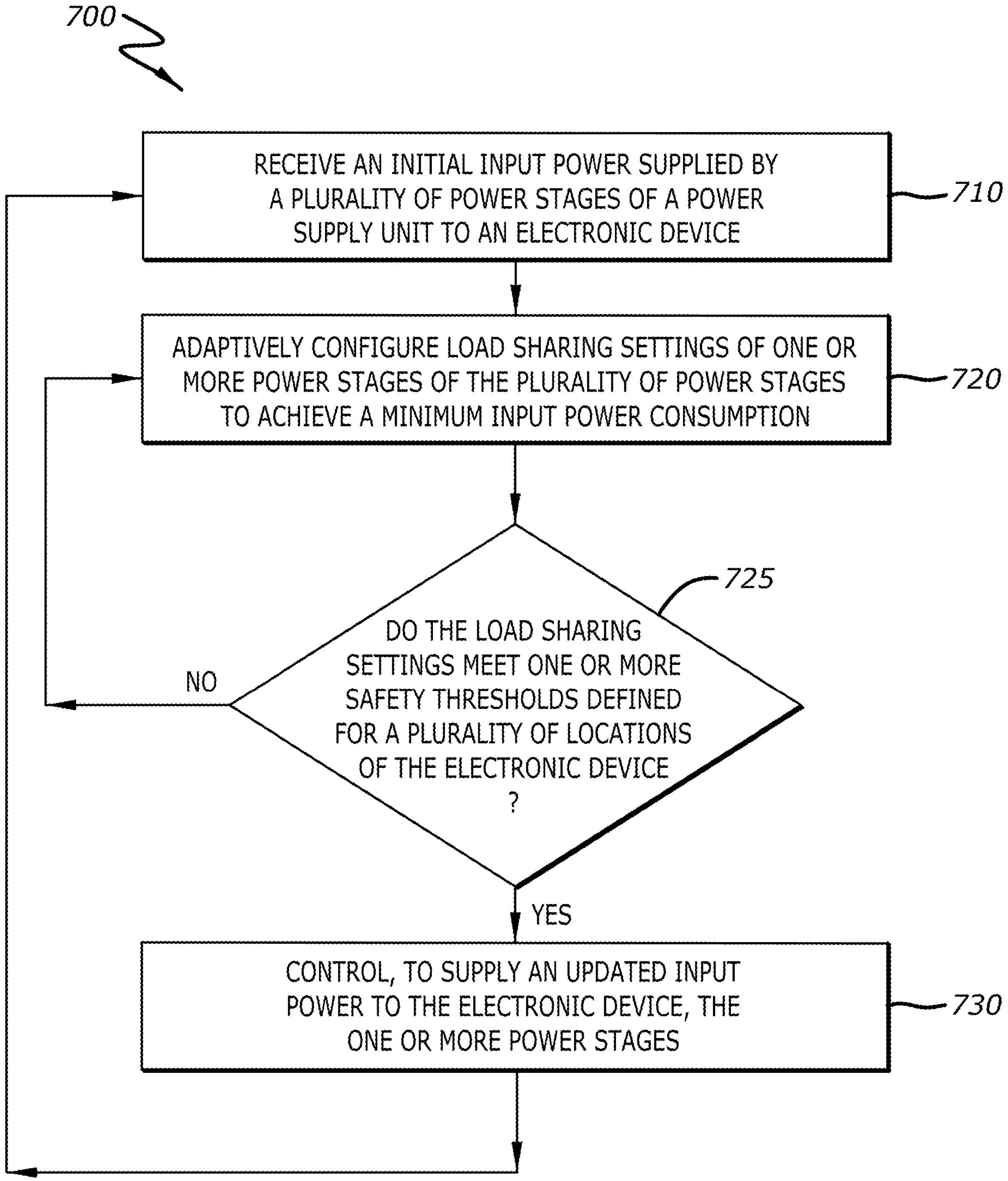
FIG. 7 is a flowchart depicting a process for adaptively optimizing load sharing based on safety thresholds in accordance with various embodiments of the disclosure.

Referring to FIG. 7, a flowchart depicting a process 700 for adaptively optimizing load sharing based on safety thresholds in accordance with various embodiments of the disclosure is shown. In many embodiments, the process 700 may receive an initial input power supplied by a plurality of power stages of a power supply unit to an electronic device (block 710). In a number of embodiments, the power stages may be operably coupled to a plurality of locations of the electronic device. In a variety of embodiments, the initial input power may correspond to a total power consumption of the electronic device. In various embodiments, the process 700 may receive the sum of the power consumption by each of the locations of the electronic device as the initial input power.

In more embodiments, the process 700 may adaptively configure load sharing settings, for example, load sharing percentages, of one or more power stages of the plurality of power stages to achieve a minimum input power consumption (block 720). The process 700 may adaptively configure load sharing settings of the power stages based on the received initial input power. In additional embodiments, the process 700 may also adaptively configure the load sharing settings of the power stages based on one or more parameters. The parameters may include, for example, one or more hardware characteristics of the electronic device, one or more environmental conditions proximate to the electronic device, one or more applications running on the electronic device, or power distribution losses in the electronic device. In further embodiments, the process 700 may adaptively configure the load sharing settings of the power stages based on load behavior of the power stages. In one or more embodiments, adaptive configuration of the load sharing settings may include iteratively adjusting the load sharing settings of the power stages by using the input power consumption from a previous iteration as feedback until the input power consumption converges to a minimum input power consumption.

In still more embodiments, the process 700 may determine whether the load sharing settings meet one or more safety thresholds defined for a plurality of locations of the electronic device (block 725). In still further embodiments, the safety thresholds may include temperature limits for various locations of the electronic device. By monitoring the temperature at different locations of the electronic device, the process 700 may determine the maximum allowable load for each power stage to prevent overheating. In still additional embodiments, each of the power stages may have specific voltage and current ratings. The safety thresholds may define maximum operating conditions based on the voltage and current ratings to avoid damaging components at the different locations of the electronic device. In other words, the process 700 determines whether the load sharing settings corresponding to the minimum input power consumption are within the bounds of the one or more safety thresholds defined for the plurality of locations of the electronic device. In response to determining that the load sharing settings do not meet the one or more safety thresholds defined for the plurality of locations of the electronic device, in some more embodiments, the process 700 may continue to adaptively configure the load sharing settings until those load sharing settings that achieve a minimum input power consumption while meeting the one or more safety thresholds are obtained (block 720).

In response to determining that the load sharing settings meets the one or more safety thresholds defined for the plurality of locations of the electronic device, in yet various embodiments, the process 700 may control, to supply an updated input power to the electronic device, the one or more power stages (block 730). In yet more embodiments, the process 700 may control the power stages based on the adaptively configured load sharing settings. The updated input power may correspond to a total power consumption of the electronic device. The updated input power may be less than the initial input power. For example, the updated input power may be the minimum input power. In still yet more embodiments, the process 700 may vary phase currents supplied by the power stages to the electronic device based on the load sharing settings. In many further embodiments, the power stages may exhibit uneven load sharing based on the adaptively configured load sharing settings and may accordingly supply the updated input power to the electronic device. In many additional embodiments, after supplying the updated input power to the electronic device, the process 700 may iteratively proceed to receive an initial input power (e.g., updated input power) supplied by the plurality of power stages to the electronic device (block 710) and repeat the adaptive configuration of the load sharing settings of the one or more power stages to achieve the minimum input power consumption (block 720) under varying one or more parameters, while also ensuring that the one or more safety thresholds are met.

Although a specific embodiment for a process 700 for adaptively optimizing load sharing based on safety thresholds suitable for carrying out the various steps, processes, methods, and operations described herein is discussed with respect to FIG. 7, any of a variety of systems and/or processes may be utilized in accordance with embodiments of the disclosure. For example, historical performance data may be utilized for defining safety thresholds and improving adaptive load sharing algorithms. Predictive analytics can forecast potential overloads and trigger preventative adjustments. The elements depicted in FIG. 7 may also be interchangeable with other elements of FIGS. 1-6 and FIGS. 8-9 as required to realize a particularly desired embodiment.

Figure 8:
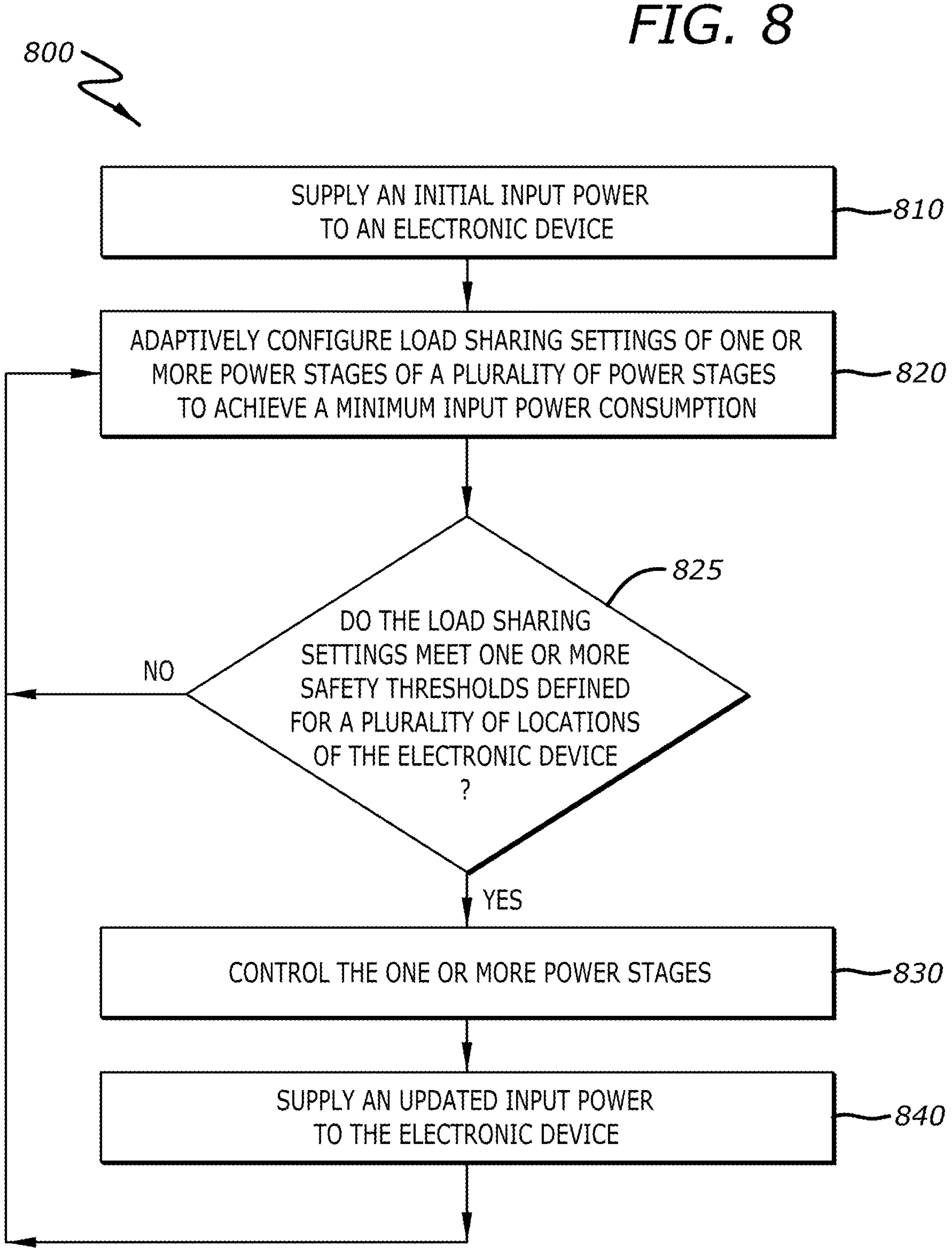
FIG. 8 is a flowchart depicting a process for supplying optimal input power to an electronic device based on adaptively optimized load sharing in accordance with various embodiments of the disclosure.

Referring to FIG. 8, a flowchart depicting a process 800 for supplying optimal input power to an electronic device based on adaptively optimized load sharing in accordance with various embodiments of the disclosure is shown. In many embodiments, the process 800 may supply an initial input power to an electronic device (block 810). The initial input power may be supplied by a plurality of power stages of a power supply unit to the electronic device. In a number of embodiments, the power stages may be operably coupled to a plurality of locations of the electronic device. In a variety of embodiments, the initial input power may correspond to a total power consumption of the electronic device. In various embodiments, the process 800 may receive the sum of the power consumption by each of the locations of the electronic device as the initial input power.

In more embodiments, the process 800 may adaptively configure load sharing settings, for example, load sharing percentages, of one or more power stages of the plurality of power stages to achieve a minimum input power consumption (block 820). The process 800 may adaptively configure load sharing settings of the power stages based on the received initial input power. In additional embodiments, the process 800 may also adaptively configure the load sharing settings of the power stages based on one or more parameters. The parameters may include, for example, one or more hardware characteristics of the electronic device, one or more environmental conditions proximate to the electronic device, one or more applications running on the electronic device, or power distribution losses in the electronic device. In further embodiments, the process 800 may adaptively configure the load sharing settings of the power stages based on load behavior of the power stages. In one or more embodiments, adaptive configuration of the load sharing settings may include iteratively adjusting the load sharing settings of the power stages by using the input power consumption from a previous iteration as feedback until the input power consumption converges to a minimum input power consumption.

In still more embodiments, the process 800 may determine whether the load sharing settings meet one or more safety thresholds defined for a plurality of locations of the electronic device (block 825). In still further embodiments, the safety thresholds may include temperature limits for various locations of the electronic device. By monitoring the temperature at different locations of the electronic device, the process 800 may determine the maximum allowable load for each power stage to prevent overheating. In still additional embodiments, each of the power stages may have specific voltage and current ratings. The safety thresholds may define maximum operating conditions based on the voltage and current ratings to avoid damaging components at the different locations of the electronic device. In other words, the process 800 determines whether the load sharing settings corresponding to the minimum input power consumption are within the bounds of the one or more safety thresholds defined for the plurality of locations of the electronic device. In response to determining that the load sharing settings do not meet one or more safety thresholds defined for a plurality of locations of the electronic device, in some more embodiments, the process 800 may continue to adaptively configure the load sharing settings until those load sharing settings that achieve a minimum input power consumption while meeting the one or more safety thresholds are obtained (block 820).

In response to determining that the load sharing settings meet the one or more safety thresholds defined for the plurality of locations of the electronic device, in yet various embodiments, the process 800 may control the one or more power stages (block 830). The power stages are operably coupled to the plurality of locations of the electronic device. In yet more embodiments, controlling the power stages may include varying phase currents supplied by the power stages to the various locations of the electronic device based on the load sharing settings. In still yet more embodiments, the process 800 may apply one or more thresholds to control the power stages. For example, the process 800 may set a threshold voltage that, when exceeded, triggers a protective mechanism to disconnect or reduce power output of the power stages. In another example, the process 800 may establish a maximum current level, which if exceeded, can reduce power or selectively shut down the power stages to prevent damage to the electronic device. In a further example, temperature sensors may be employed to monitor heat generated in the power stages. If a particular temperature is reached, the process 800 can reduce power or selectively shut down the power stages 106 to avoid overheating.

In many further embodiments, the process 800 may supply an updated input power to the electronic device (block 840). The process 800 may supply the updated input power to the electronic device from the power stages controlled based on the adaptively configured load sharing settings. The updated input power may correspond to a total power consumption of the electronic device. The updated input power may be less than the initial input power. For example, the updated input power may be the minimum input power. In many additional embodiments, the process 800 may vary phase currents supplied by the power stages to the electronic device based on the load sharing settings. In still yet further embodiments, the power stages may exhibit uneven load sharing based on the adaptively configured load sharing settings and may accordingly supply the updated input power to the electronic device. In many additional embodiments, after supplying the updated input power to the electronic device, the process 800 may iteratively proceed to adaptively configure the load sharing settings of the one or more power stages to achieve the minimum input power consumption (block 820) under varying one or more parameters, while also ensuring that the one or more safety thresholds are met.

Although a specific embodiment for a process 800 for supplying optimal input power to an electronic device based on adaptively optimized load sharing suitable for carrying out the various steps, processes, methods, and operations described herein is discussed with respect to FIG. 8, any of a variety of systems and/or processes may be utilized in accordance with embodiments of the disclosure. For example, feedback loops may be incorporated in the power stages to monitor real-time conditions allowing the power supply unit to adapt dynamically. If a threshold is approached, the load sharing can be recalibrated to reduce strain on affected stages. The elements depicted in FIG. 8 may also be interchangeable with other elements of FIGS. 1-7 and FIG. 9 as required to realize a particularly desired embodiment.

Figure 9:
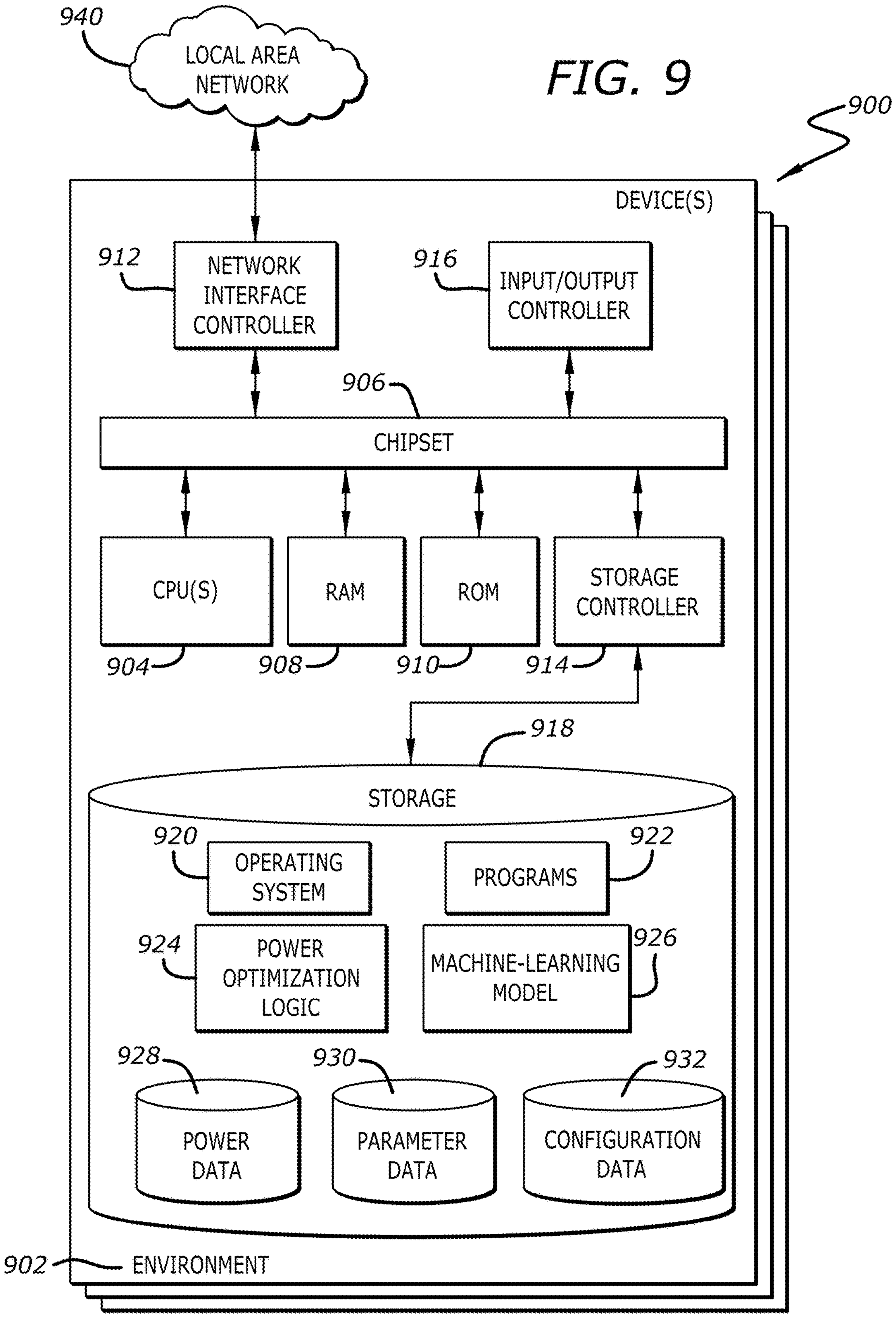
FIG. 9 is a conceptual block diagram of a device capable of executing components and a power optimization logic for implementing the functionality and embodiments described above.

Referring to FIG. 9, a conceptual block diagram of a device 900 capable of executing components and a power optimization logic 924 for implementing the functionality and embodiments described above is shown. The embodiment of the conceptual block diagram depicted in FIG. 9 can illustrate a conventional server computer, a workstation, a desktop computer, a laptop, a tablet, a network appliance, an electronic reader (e-reader), a smartphone, or other computing device, and can be utilized to execute any of the application and/or logic components presented herein. The device 900 may, in some examples, correspond to a physical device or to a virtual resource described herein. The device 900 can be, for example, an electronic device, a controller, a control device, or the like in accordance with various embodiments of the disclosure.

In many embodiments, the device 900 may include an environment 902 such as a baseboard or a "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In a number of embodiments, one or more processors 904, such as, but not limited to, CPUs can be configured to operate in conjunction with a chipset 906. The processor(s) 904 can be standard programmable CPUs that perform arithmetic and logical operations necessary for the operation of the device 900.

In a variety of embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 906 may provide an interface between the processor(s) 904 and the remainder of the components and devices within the environment 902. The chipset 906 can provide an interface to a random-access memory (RAM) 908, which can be utilized as the main memory in the device 900 in some embodiments. The chipset 906 can further be configured to provide an interface to a computer-readable storage medium such as a read-only memory (ROM) 910 or a Non-Volatile RAM (NVRAM) for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the local area network 940. The chipset 906 can include functionality for providing network connectivity through a Network Interface Controller (NIC) 912, which may include a gigabit Ethernet adapter or similar component. The NIC 912 can be capable of connecting the device 900 to other devices over the local area network 940. It is contemplated that multiple NICs 912 may be present in the device 900, connecting the device 900 to other types of networks and remote systems.

In more embodiments, the device 900 can be connected to a storage 918 that provides non-volatile storage for data accessible by the device 900. The storage 918 can, for example, store an operating system 920, applications or programs 922, power data 928, parameter data 930, and configuration data 932, which are described in greater detail below. The storage 918 can be connected to the environment 902 through a storage controller 914 connected to the chipset 906. In additional embodiments, the storage 918 can include one or more physical storage units. The storage controller 914 can interface with the physical storage units through a Serial Advanced Technology Attachment (SATA) interface, a Fiber Channel (FC) interface, a Serial Attached SCSI (SAS) interface, where SCSI refers to a Small Computer System Interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology utilized to implement the physical storage units, whether the storage 918 is characterized as primary or secondary storage, and the like. For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to the device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, Erasable programmable ROM (EPROM), Electrically-Erasable programmable ROM (EEPROM), flash memory or other solid-state memory technology, Compact Disc-ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be utilized to store the desired information in a non-transitory fashion.

As mentioned briefly above, the storage 918 can store an operating system 920 utilized to control the operation of the device 900. According to one embodiment, the operating system 920 includes the LINUX operating system. According to another embodiment, the operating system 920 includes the Windows® server operating system from Microsoft Corporation of Redmond, Washington. According to further embodiments, the operating system 920 can include the UNIX operating system or one of its variants. It should be appreciated that other operating systems can also be utilized. The storage 918 can store other system or application programs and data utilized by the device 900.

In still more embodiments, the storage 918 or other computer-readable storage media is encoded with computer-executable instructions which, when loaded into the device 900, may transform the device 900 from a general-purpose computing system into a special-purpose computer capable of implementing the embodiments described herein. These computer-executable instructions may be stored as applications or programs 922 and transform the device 900 by specifying how the processor(s) 904 can transition between states, as described above. In still further embodiments, the device 900 has access to computer-readable storage media storing computer-executable instructions which, when executed by the device 900, perform the various processes described above with regard to FIGS. 1-9. In still additional embodiments, the device 900 can also include computer-readable storage media having instructions stored thereupon for performing any of the other computer-implemented operations described herein.

In some more embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 may not include all of the components shown in FIG. 9, and can include other components that are not explicitly shown in FIG. 9, or may utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In yet various embodiments, the device 900 can include a power optimization logic 924 that may be responsible for adaptively optimizing load sharing between multiple power stages of a power supply unit to minimize power consumption. In yet more embodiments, the power optimization logic may operate in the controller of the power supply unit. In embodiments where the device 900 corresponds to the controller, the power optimization logic 924 can be configured to perform various operations such as, but not limited to, receiving an initial input power supplied by a plurality of power stages of a power supply unit to an electronic device; adaptively configuring load sharing settings of one or more power stages of the plurality of power stages based on the initial input power and one or more parameters associated with the electronic device; and control, to supply an updated input power to the electronic device, the power stage(s) based on the adaptively configured load sharing settings.

Those skilled in the art will recognize that the power optimization logic 924 can include various hardware and/or software deployments and can be configured in a variety of ways. In still yet more embodiments, the power optimization logic 924 can be configured as a standalone device, exist as a logic in another device, be distributed among various devices operating in tandem, or remotely operated as part of a cloud-based power management system. In many further embodiments, one or more servers can be configured with the power optimization logic 924 or can otherwise operate as the power optimization logic 924. In many additional embodiments, the power optimization logic 924 may operate on one or more servers connected to a communication network, for example, the Internet. The communication network can include wired networks or wireless networks. The power optimization logic 924 can be provided as a cloud-based service that can service remote networks, such as, but not limited to a deployed network. Further, in still yet further embodiments, the power optimization logic 924 may be operated as a distributed logic across multiple network devices. In an embodiment, the control device 102 (shown in FIG. 1) or the controller 108 can operate as the power optimization logic 924 or may have multiple devices operate as the power optimization logic 924 in a distributed manner.

In several embodiments, the storage 918 can include power data 928. The power data 928 may relate to data representative of load or power consumed by the electronic device. For example, the power data 928 may include measurements of power levels or input power supplied by the power stages of the power supply unit to the electronic device. The power data 928 may allow the controller to adaptively configure load sharing settings of one or more of the power stages.

In several more embodiments, the storage 918 can include parameter data 930. The parameter data 930 may relate to data representative of different parameters utilized by the controller for adaptively configuring load sharing settings of one or more of the power stages. The parameter data 930 can include, but is not limited to, one or more hardware characteristics of the electronic device, one or more environmental conditions proximate to the electronic device, one or more applications running on the electronic device, or power distribution losses in the electronic device. In several embodiments, in addition to the power data 928, the parameter data 930 may be utilized by the power optimization logic 924 to adaptively configure load sharing settings of one or more of the power stages.

In numerous embodiments, the storage 918 can include configuration data 932. The configuration data 932 may relate to data representative of the adaptive configuration of the load sharing settings of the one or more power stages. For example, the configuration data 932 may include power data, parameter data, threshold data, load behavior pattern data, range data, or the like. The configuration data 932 may allow the controller to control the one or more power stages based on the adaptively configured load sharing settings, to supply an updated input power to the electronic device.

In numerous additional embodiments, data may be processed into a format usable by a machine-learning ("ML") model 926 (e.g., feature vectors), and or other preprocessing techniques. The ML model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models. The ML model 926 may be configured to analyze the power data 928, the parameter data 930, and the configuration data 932 for adaptively optimizing load sharing between multiple power stages of a power supply unit to minimize power consumption. In further additional embodiments, the ML model 926 may be utilized to identify various parameters to include in the power data 928, the parameter data 930, and the configuration data 932. For example, the ML model 926 may analyze the power data 928, the parameter data 930, and the configuration data 932 and identify parameters that are required to augment the power data 928, the parameter data 930, and the configuration data 932. Once the parameters are identified, the power optimization logic 924 may utilize the parameters to adaptively optimize load sharing between multiple power stages of a power supply unit to minimize power consumption. For example, the ML model 926 may be configured to receive the power data 928 and the parameter data 930. The power optimization logic 924 may then utilize trained models to adaptively configure load sharing settings of one or more power stages based on the initial input power and one or more parameters associated with the electronic device.

Although a specific embodiment for a device 900 capable of executing components and the power optimization logic 924 for implementing the functionality and embodiments suitable for carrying out the various steps, processes, methods, and operations described herein is discussed with respect to FIG. 9, any of a variety of systems and/or processes may be utilized in accordance with embodiments of the disclosure. For example, the device may be implemented in a virtual environment such as a cloud-based network administration suite or a cloud computing environment, or the device may be distributed across a variety of network devices such that each acts as a device and the power optimization logic 924 acts in tandem between the devices. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary", or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor; and a memory communicatively coupled to the processor, wherein the memory comprises a power optimization logic that is configured to:

receive power data indicative of an initial input power supplied by a plurality of power stages of a power supply unit to an electronic device;

adaptively configure load sharing settings of one or more power stages of the plurality of power stages based on the power data indicative of the initial input power and one or more parameters associated with the electronic device; and control, to supply an updated input power to the electronic device, the one or more power stages based on the adaptively configured load sharing settings.

2. The device of claim 1, wherein the one or more parameters comprise at least one of: one or more hardware characteristics of the electronic device, one or more environmental conditions proximate to the electronic device, one or more applications running on the electronic device, or power distribution losses in the electronic device.

3. The device of claim 1, wherein the load sharing settings of the one or more power stages are adaptively configured further based on load behavior of the plurality of power stages.

4. The device of claim 1, wherein the plurality of power stages exhibits uneven load sharing based on the adaptively configured load sharing settings.

5. The device of claim 1, wherein the plurality of power stages is operably coupled to a plurality of locations of the electronic device.

6. The device of claim 5, wherein the load sharing settings of the one or more power stages are adaptively configured based on safety thresholds defined for the plurality of locations of the electronic device.

7. The device of claim 5, wherein a location of the plurality of locations comprises a power monitor located in the electronic device.

8. The device of claim 7, wherein the location of the plurality of locations comprises one or more pins external to the electronic device, and wherein the one or more pins are associated with the power monitor.

9. The device of claim 5, wherein the electronic device is disposed on a printed circuit board and a location of the plurality of locations comprises one or more sense points on the printed circuit board.

10. The device of claim 1, wherein the adaptive configuration of the load sharing settings of the one or more power stages is performed in real time or near real time.

11. The device of claim 1, wherein controlling the one or more power stages comprises varying phase currents supplied by the one or more power stages to the electronic device based on the load sharing settings.

12. The device of claim 1, wherein the initial input power and the updated input power correspond to a total power consumption of the electronic device.

13. The device of claim 12, wherein the updated input power is less than the initial input power.

14. The device of claim 13, wherein the updated input power is a minimum input power.

15. The device of claim 1, wherein the power optimization logic is further configured to apply one or more thresholds to control the one or more power stages.

16. The device of claim 1, wherein the updated input power is supplied to the electronic device in accordance with a configurable range.

17. A power supply unit, comprising:

a plurality of power stages configured to supply an initial input power to an electronic device; and a controller operably coupled to the plurality of power stages, wherein the controller is configured to:

adaptively configure load sharing settings of one or more power stages of the plurality of power stages based on power data indicative of the initial input power and one or more parameters associated with the electronic device; and control, to supply an updated input power to the electronic device, the one or more power stages based on the adaptively configured load sharing settings.

18. The power supply unit of claim 17, wherein the one or more parameters comprise at least one of: one or more hardware characteristics of the electronic device, one or more environmental conditions proximate to the electronic device, one or more applications running on the electronic device, or power distribution losses in the electronic device.

19. The power supply unit of claim 17, wherein the plurality of power stages exhibits uneven load sharing based on the adaptively configured load sharing settings.

20. A method for adaptively optimizing load sharing, comprising:

receiving an initial input power supplied by a plurality of power stages of a power supply unit to an electronic device;

adaptively configuring load sharing settings of one or more power stages of the plurality of power stages based on the power data indicative of the initial input power and one or more parameters associated with the electronic device; and controlling, to supply an updated input power to the electronic device, the one or more power stages based on the adaptively configured load sharing settings.

* * * * *